(12) United States Patent
Yu et al.

(10) Patent No.: US 10,696,790 B2
(45) Date of Patent: Jun. 30, 2020

(54) GRAPHENE DISPERSANT AND APPLICATION THEREOF

(71) Applicants: NINGBO ZKJH NEW MATERIAL CO., LTD., Ningbo (CN); NINGBO INSTITUTE OF MATERIALS TECHNOLOGY AND ENGINEERING, CHINESE ACADEMY OF SCIENCES, Ningbo (CN)

(72) Inventors: Haibin Yu, Ningbo (CN); Yan Zheng, Ningbo (CN); Lin Gu, Ningbo (CN)

(73) Assignees: NINGBO ZKJH NEW MATERIAL CO., LTD., Ningbo (CN); NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 117 days.

(21) Appl. No.: 15/607,552

(22) Filed: May 29, 2017

(65) Prior Publication Data

US 2017/0260054 A1   Sep. 14, 2017

Related U.S. Application Data

(63) Continuation of application No. PCT/CN2015/095742, filed on Nov. 27, 2015.

(30) Foreign Application Priority Data

Dec. 2, 2014  (CN) ........................ 2014 1 0720559
Dec. 2, 2014  (CN) ........................ 2014 1 0722468

(Continued)

(51) Int. Cl.
*C01B 32/194* (2017.01)
*C08G 73/02* (2006.01)
(Continued)

(52) U.S. Cl.
CPC ........ *C08G 73/0266* (2013.01); *C01B 32/184* (2017.08); *C01B 32/194* (2017.08); *C01B 2204/28* (2013.01); *C08L 83/04* (2013.01)

(58) Field of Classification Search
CPC . C01B 32/184; C01B 32/194; C01B 2204/28; C08G 73/0266; C08L 83/04
See application file for complete search history.

(56) References Cited

U.S. PATENT DOCUMENTS

| | | | | |
|---|---|---|---|---|
| 2012/0263939 A1* | 10/2012 | Tao | ........................... | H01B 1/24 428/323 |
| 2015/0315387 A1* | 11/2015 | Yeh | ..................... | C08G 73/0273 524/775 |
| 2017/0051167 A1* | 2/2017 | Bocchini | ................ | C09D 11/52 |

FOREIGN PATENT DOCUMENTS

| | | | |
|---|---|---|---|
| CN | 101740234 A | * | 6/2010 |
| CN | 103086362 A | * | 5/2013 |

OTHER PUBLICATIONS

Ding, Y. H., et al. "A green approach to the synthesis of reduced graphene oxide nanosheets under UV irradiation." Nanotechnology 22.21 (2011): 215601.*
(Continued)

*Primary Examiner* — Richard M Rump

(57) ABSTRACT

The present disclosure provides a method for dispersing graphene. The method includes the following steps: providing a graphene material and a graphene dispersant, wherein the graphene dispersant comprises aniline oligomer or aniline oligomer derivative, the aniline oligomer or aniline oligomer derivative is an electroactive polymer, and the aniline oligomer or aniline oligomer derivative is able to
(Continued)

combine with the graphene material via π-π bond; and adding the graphene material and the graphene dispersant to a dispersing medium, making the aniline oligomer or aniline oligomer derivative combine with the graphene material via π-π bond, and dispersing the graphene material in the dispersing medium by the graphene dispersant.

12 Claims, 10 Drawing Sheets

(30) Foreign Application Priority Data

| Dec. 2, 2014 | (CN) | 2014 1 0722772 |
| Dec. 16, 2014 | (CN) | 2014 1 0781191 |
| Dec. 24, 2014 | (CN) | 2014 1 0813889 |
| Dec. 24, 2014 | (CN) | 2014 1 0814796 |
| Dec. 24, 2014 | (CN) | 2014 1 0814945 |
| Dec. 24, 2014 | (CN) | 2014 1 0815986 |
| Dec. 24, 2014 | (CN) | 2014 1 0815993 |
| Dec. 24, 2014 | (CN) | 2014 1 0816024 |
| Dec. 24, 2014 | (CN) | 2014 1 0816025 |
| Dec. 24, 2014 | (CN) | 2014 1 0816051 |
| Dec. 24, 2014 | (CN) | 2014 1 0819604 |

(51) Int. Cl.
*C01B 32/184* (2017.01)
*C08L 83/04* (2006.01)

(56) References Cited

OTHER PUBLICATIONS

Definition of reductive from Google (2019).*

Rwei, Syang-Peng, and I-Ting Huang. "Synthesis and characterization of a poly-tetraaniline-urethane/Ag-nanowire or/graphene conductive elastomer." Colloid and Polymer Science 293.3 (2015): 841-850.*

Gu, Lin, et al. "Facile preparation of water-dispersible graphene sheets stabilized by carboxylated oligoanilines and their anticorrosion coatings." ACS applied materials & interfaces 7.32 (2015): 17641-17648.*

* cited by examiner

GRAPHENE DISPERSANT AND APPLICATION THEREOF

CROSS-REFERENCE TO RELATED APPLICATIONS

This application claims priority to and benefits of Chinese Patent Application Serial Nos. CN201410720559.1, CN201410722468.1, CN201410722772.6, filed with the State Intellectual Property Office of P. R. China on Dec. 2, 2014, Chinese Patent Application Serial No. CN201410781191.X, filed with the State Intellectual Property Office of P. R. China on Dec. 16, 2014, Chinese Patent Application Serial Nos. CN201410814796.4, CN201410815986.8, CN201410816051.1, CN201410814945.7, CN201410816024.4, CN201410815993.8, CN201410819604.9, CN201410816025.9, CN201410813889.5, filed with the State Intellectual Property Office of P. R. China on Dec. 24, 2014, the entire contents of which are incorporated herein by reference.

TECHNICAL FIELD

The present disclosure relates to the field of a graphene dispersant and application thereof.

BACKGROUND

Graphene is composed of carbon atoms, which has a structure of hexagonal lattice like honeycomb. The graphene has a thickness of one carbon atom. The graphene was discovered in 2004, and the 2010 Nobel Prize in physics was granted for this discovery. The single atom structure of the graphene results in its unique performances. For example, ① highly electric conductive: because electrons in the graphene almost have no quality and speed of electrons can reach 1/300 of the speed of light, the graphene has superior electric conductivity. ② ultra high strength:the hardness of the graphene is higher than that of diamond, and the graphene has good toughness and can be bent. ③ large surface area:the surface area of single-layer graphene can reach to 2630 $m^2/g$, and surface area of activated carbon is only 1500 $m^2/G$, the large surface area makes the graphene becoming energy storage material of huge potential. Since the graphene has a number of excellent performances, research on the graphene is inspired in the worldwide.

Recently, many studies have focused on synthesis of graphene of large size in large scale. At present, the methods for making graphene can be a method of mechanical exfoliation, a method of chemical vapor deposition, a method of oxidation-reduction, a method of ultrasonic peeling, and so on. However, the graphene is easily aggregated, due to $\pi$-$\pi$ conjugated effect and van der Waals forces. In addition, because of its unique structure, it is difficult to have physical or chemical action with other medium for graphene, and combining strength between the graphene and other medium is low, resulting in limit of its applications. Therefore, biggest bottleneck of application of graphene is how to obtain stable and easy dispersion of modified graphene, in order to develop its unique physical and chemical properties.

SUMMARY

The present disclosure aims to provide methods for dispersing graphene and the application thereof. The graphene can be dispersed uniformly by the graphene dispersant, to achieve large applications in various fields.

The present disclosure provides a method for dispersing graphene, the method comprising the following steps:
providing a graphene material and a graphene dispersant, wherein the graphene dispersant comprises aniline oligomer or aniline oligomer derivative, the aniline oligomer or aniline oligomer derivative is an electroactive polymer, and the aniline oligomer or aniline oligomer derivative is able to combine with the graphene material via $\pi$-$\pi$ bond; and
adding the graphene material and the graphene dispersant to a dispersing medium, making the aniline oligomer or aniline oligomer derivative combine with the graphene material via $\pi$-$\pi$ bond, and dispersing the graphene material in the dispersing medium by the graphene dispersant.

The present disclosure also provides a graphene composite powder, comprising graphene powder, a graphene dispersant, and a dispersing agent, the graphene dispersant and the dispersing agent are dispersed uniformly in the graphene powder, the graphene dispersant comprises aniline oligomer or aniline oligomer derivative, the aniline oligomer or aniline oligomer derivative is an electroactive polymer, and the aniline oligomer or aniline oligomer derivative is combined with graphene powder via $\pi$-$\pi$ bond.

The present disclosure also provides a method for making a graphene composite powder, comprising the following steps:
dispersing a graphene material in a dispersing medium and obtaining a mixture A;
adding a dispersing agent and aniline oligomer or aniline oligomer derivative, and obtaining a mixture B, wherein the graphene is mixed uniformly with the aniline oligomer or aniline oligomer derivative, and a $\pi$-$\pi$ bond is formed between the graphene and the aniline oligomer or aniline oligomer derivative; and
drying the mixture B and obtaining the graphene composite powder modified by the aniline oligomer or aniline oligomer derivative.

Compared with the prior art, the present disclosure provides a graphene dispersant comprising aniline oligomer or aniline oligomer derivative. The structure of the aniline oligomer or aniline oligomer derivative includes a benzene ring with $\pi$ bond, which is similar with the ring of six carbon of the graphene. Thus, the aniline oligomer or aniline oligomer derivative is combined with the graphene via $\pi$-$\pi$ bond. Because the aniline oligomer or aniline oligomer derivative is an electroactive polymer, adjacent two molecules of the aniline oligomer or aniline oligomer derivative cannot be easily stacked, resulting in the graphene combined with the aniline oligomer or aniline oligomer derivative can be dispersed uniformly and preventing to be stacked. In a word, the graphene has excellent dispersibility and chemical stability after being modified by the aniline oligomer or aniline oligomer derivative. The graphene can be easily dispersed in many kinds of mediums or coated on a surface of a base material, which improving the application of graphene. Through the method for dispersing graphene and the methods for making relevant graphene products, the products including graphene have excellent dispersibility and chemical stability. The process of the method is simple and costs low, which is good for industrialized application of the graphene.

BRIEF DESCRIPTION OF THE DRAWINGS

FIG. 1a is Raman spectra of the graphene composite powder of embodiment 1a and untreated graphene of controlled example 1a, wherein the solid line is corresponding to the graphene composite powder of embodiment 1a, and the broken line is corresponding to untreated graphene of controlled example 1a.

FIG. 2b shows Scanning Electron Microscope (SEM) image of the graphene composite powder of embodiment 2a.

FIG. 5a shows a photograph of the graphene composite paper of embodiment 5a.

FIG. 6f is polarization curves of graphene composite coating of embodiment 6a and epoxy resin coating of controlled example 3a immersing in NaCl solution with 3.5 weight percent for 8 days, wherein the solid line is corresponding to embodiment 6a, and the broken line is corresponding to controlled example 3a.

FIG. 6h is AC impedance spectra of graphene composite coating of embodiment 6a, epoxy resin coating of controlled example 3a, and market epoxy zinc rich coating immersing in NaCl solution with 3.5 weight percent for 8 days, wherein curve a is corresponding to market epoxy zinc rich coating, curve b is corresponding to epoxy resin coating of controlled example 3a, and curve c is corresponding to graphene composite coating of embodiment 6a.

FIG. 7a is surface images of water soluble epoxy resin coating of controlled example 4a and water soluble graphene composite coating of embodiment 7a after salt spray test for 500 hours, wherein left image is corresponding to controlled example 4a, and right image is corresponding to embodiment 7a.

FIG. 7b is self corrosion potential curves of water soluble epoxy resin coating of controlled example 4a and water soluble graphene composite coating of embodiment 7a immersing in NaCl solution with 3.5 weight percent for 48 hours, wherein curve a is corresponding to controlled example 4a, and curve b is corresponding to embodiment 7a.

FIG. 7g is polarization curves of water soluble graphene composite coating of embodiment 7a and water soluble epoxy resin coating of controlled example 4a immersing in NaCl solution with 3.5 weight percent for 48 hours, wherein the solid line is corresponding to embodiment 7a, and the broken line is corresponding to controlled example 4a.

FIG. 7i is images of surface contact angle of water soluble graphene composite coating of embodiment 7a and water soluble epoxy resin coating of controlled example 4a, wherein image (a) is corresponding to controlled example 4a, and image (b) is corresponding to embodiment 7a.

DETAILED DESCRIPTION

Figure 1A:
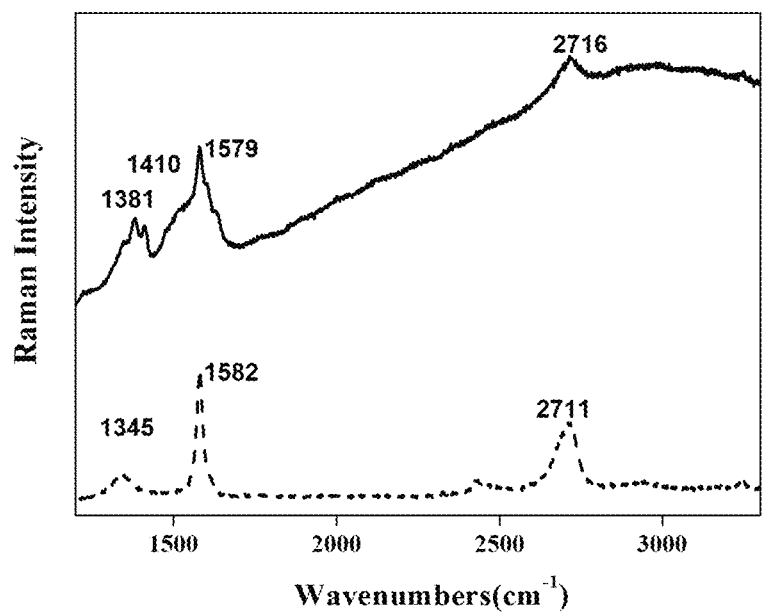

The disclosure is illustrated by ways of examples and the accompanying drawings.

An embodiment of the disclosure provides a graphene dispersant used for dispersing graphene. The graphene dispersant comprises aniline oligomer or aniline oligomer derivative.

The aniline oligomer is selected from the group consisting of aniline trimer, aniline tetramer, aniline pentamer, aniline hexamer, aniline octamer, and combination thereof. The aniline oligomer derivative is aniline oligomer with functional groups, the functional groups are carboxyl group, hydroxyl group, carbonyl group, esters group, amino group, hydroxyl group, alkyl group, sulfonic acid group, phosphate group, epoxy group, polyethylene glycol group, polyvinyl alcohol group, or combinations thereof.

The structure of aniline oligomer or aniline oligomer derivative can be as follows:

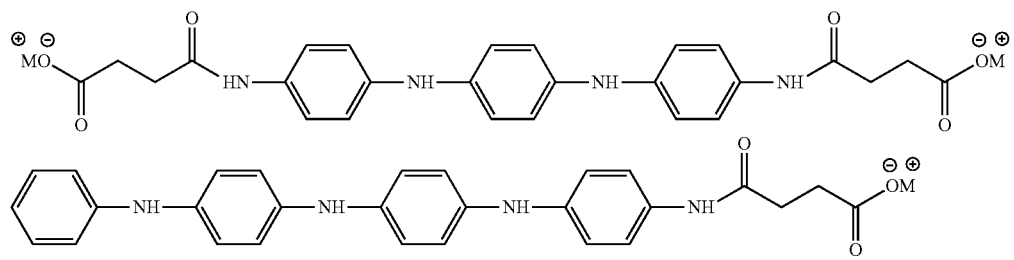

wherein M is mainly sodium ion, potassium ion, quaternary ammonium salt, and so on.

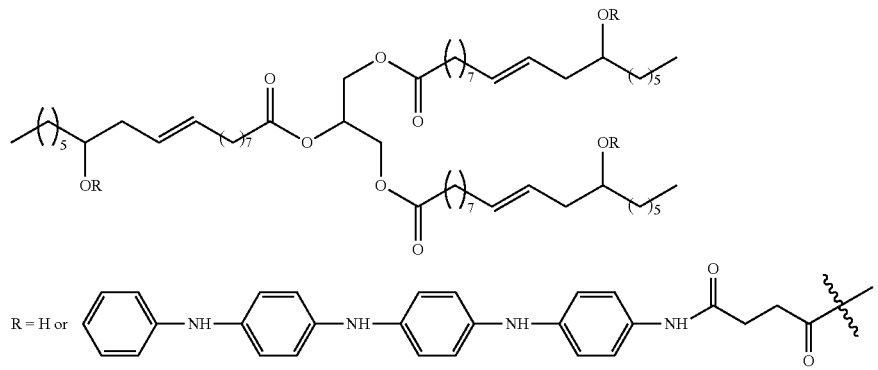

The aniline oligomer or aniline oligomer derivative is an electroactive polymer. The aniline oligomer or aniline oligomer derivative is able to combine with graphene via π-π bond. In detail, because benzene ring of the structure of the aniline oligomer or aniline oligomer derivative is similar with the ring of six carbon of the graphene. Thus, the aniline oligomer or aniline oligomer derivative is combined with the graphene via π-π bond. In addition, the aniline oligomer or aniline oligomer derivative is an electroactive polymer, so adjacent two molecules of the aniline oligomer or aniline oligomer derivative cannot easily be stacked, resulting in the graphene combined with the aniline oligomer or aniline oligomer derivative can be dispersed uniformly and preventing to be stacked. In a word, the graphene has excellent dispersibility and chemical stability through the aniline oligomer or aniline oligomer derivative. It is needed to point out that, the type of π-π bond between the aniline oligomer or aniline oligomer derivative and the graphene is different from chemical graft modification, which does not destroy the structure of graphene itself. Also this type of π-π bond is different from the physical coating graphene by polymers, which does not reduce the performance of graphene. That is, the graphene modified by aniline oligomer or aniline oligomer derivative has excellent dispersibility and chemical stability, neither destroying the structure of the graphene nor reducing original performance of the graphene.

The disclosure provides a method for dispersing graphene. The method comprising the following steps:

S11, providing graphene material and a graphene dispersant, wherein the graphene dispersant comprises aniline oligomer or aniline oligomer derivative, the aniline oligomer or aniline oligomer derivative is an electroactive polymer, and the aniline oligomer or aniline oligomer derivative is able to combine with the graphene material via π-π bond; and S12, adding the graphene material and the graphene dispersant to a dispersing medium, and making the aniline oligomer or aniline oligomer derivative combine with the graphene material via π-π bond.

In Step S11, the graphene can be reducible. The structure of graphene is not restricted. The graphene can be graphene nanosheets, graphene microsheets, graphene nanobelts, a few layer graphene (2~5 layers), multilayer graphene (2~9 layers), graphene quantum dots and derivatives of the graphene material. The definition of the graphene material can be found in the document "All in the graphene family—A recommended materials nomenclature for two-dimensional carbon". A thickness of the graphene material can be less than or equal to 20 nanometers, and more preferably, less than or equal to 10 nanometers. In one embodiment, the optimum thickness of the graphene material is less than or equal to 3 nanometers. Thinner the thickness of the graphene material is, the better the flexibility of the graphene material is, and easier the processing of the graphene material is. The methods for making the graphene material is not limited, and the graphene material can be prepared by conventional preparation method to one in the art. The graphene material can be prepared by thermal expansion of graphene oxide, which is formed via chemical oxidation process, such as the method of Brodie, the method of Hummers, or the method of Staudenmaier. The graphene material can also be prepared by the method of mechanical stripping, the method of liquid exfoliation, or the method of electrochemical stripping.

In Step S12, the dispersing medium comprises water, organic solvent, polymer, or combinations thereof. The organic solvent can be selected according to specific application. The organic solvent can be selected from the group consisting of ethanol, acetone, isopropyl alcohol, butyl alcohol, ethyl acetate, toluene, chloroform, N,N-dimethylformamide, dimethyl sulfoxide, and dichloroethane. The volume ratio of the graphene material, the graphene dispersant, and water or organic solvent is adjusted according to specific needs. In one embodiment, a mass ratio of the graphene material and water or organic solvent is 1:10~1:10000. In order to avoiding when the content of graphene too low, its application significance is not large, and when the graphite content is too high, the aniline oligomer or aniline oligomer derivative on the dispersion effect is limited, preferably, the mass ratio of the graphene and the organic solvent or water is 1:20~1:1000. A ratio of the weight of the aniline oligomer or aniline oligomer and the total weight of the graphene material and the water or organic solvent is (0.01~10):100. More preferably, the ratio of the weight of the aniline oligomer or aniline oligomer and the total weight of the graphene material and water or organic solvent is (6~10):100.

The disclosure provides a method for making a graphene composite powder. The method for making the graphene composite powder comprises the following steps:

S21, dispersing a graphene material in a dispersing medium and obtaining a mixture A. The dispersing medium can be water, ethanol, acetone, isopropyl alcohol, butyl alcohol, ethyl acetate, toluene, chloroform, N,N-dimethylformamide, dimethyl sulfoxide, dichloroethane, or combinations thereof. A mass ratio of the graphene material and the dispersing medium can be 1:10~1:10000. In order to avoiding when the content of graphene too low, its application significance is not large, and when the graphite content is too high, the aniline oligomer or aniline oligomer derivative on the dispersion effect is limited, preferably, the mass ratio of the graphene material and the dispersing medium is 1:20~1:1000.

S22, adding a dispersing agent and aniline oligomer or aniline oligomer derivative, and obtaining a mixture B, wherein the graphene material is mixed uniformly with the aniline oligomer or aniline oligomer derivative, and a π-π bond is formed between the graphene material and the aniline oligomer or aniline oligomer derivative. The aniline oligomer or aniline oligomer derivative has good solubility and can be soluble in the dispersing medium.

Preferably, a mass ratio of the aniline oligomer or aniline oligomer derivative and the mixture A is (0.01~10):100. More preferably, the mass ratio of the aniline oligomer or aniline oligomer derivative and the mixture A is (6~10):100.

The dispersing agent is used to make the graphene material dispersing uniformly. The dispersing agent can be selected from the group consisting of silane coupling agent, polyvinyl alcohol, polyvinyl pyrrolidone, organic modified polysiloxane dipropylene glycol monomethyl ether solution, organic silicon surfactant and/or fluorosurfactant. And a mass ratio of the dispersing agent and the mixture A is (0.01~1):100.

S23, drying the mixture B and obtaining the graphene composite powder modified by the aniline oligomer or aniline oligomer derivative. In the dried graphene composite powder, the mass percent of the aniline oligomer or aniline oligomer derivative is 0.1%~50%.

The method for making the graphene composite powder is innovate, and can make the graphene composite powder with good dispersion and chemical stability. The process of making the graphene composite powder is simple and costs low, which is good for industrialized application of the graphene material.

Referring to FIG. 1c, the present disclosure also provides a graphene composite powder, which is made via the above mentioned method. The graphene composite powder includes graphene powder, aaniline oligomer or aniline oligomer derivative, and a dispersing agent. The aniline oligomer or aniline oligomer derivative and the dispersing agent are dispersed uniformly in the graphene powder. The graphene powder modifed by the aniline oligomer or aniline oligomer derivative has improved dispersibility and chemical stability. The graphene composite powder can be easily dispersed in many kinds of mediums or coated on a surface of a base material, which improving the application of graphene.

In order to further describe the present disclosure, methods for making the graphene composite powder with different parameters are as follows.

Embodiment 1a

The quality of each component is as follows:

graphene powder (single layer), 2 g;

deionized water (dispersing medium), 98 g;

aniline trimer carboxylic acid derivatives (containing carboxyl groups, modifiers), 1 g;

polyvinylpyrrolidone (dispersing agent), 0.05 g.

Graphene and dispersing medium were mixed and stirred by 1500 rad/min at high speed for 20 minutes. A mixture A was obtained by ultrasonic dispersion of 20 minutes. Then, the dispersing agent and the aniline trimer carboxylic acid derivative were added to the mixture A. After being stirred at a constant temperature of 70 degrees centigrade for 2 h and precipitated by centrifugation, a mixture B is obtained. A graphene composite powder modified by aniline trimer carboxylic acid derivative is obtained after being dried at 60 degrees centigrade.

The obtained graphene composite powder were tested for their properties. In detail, the obtained graphene composite powder was dispersed in a solvent to observe dispersion effect, surface properties and stability of the graphene composite powder. The stability test was that the prepared slurry containing graphene composite powder was stored for 3 months and then observed. The solvent is a common solvent, which can be water, ethanol (EtOH), tetrahydrofuran (THF), and so on. The main properties of the obtained graphene composite powder were shown in table 1a.

Embodiment 1b

The quality of each component is as follows:

graphene powder (multi-layer), 5 g;

ethanol (dispersing medium), 92 g;

aniline tetramer alkyl derivatives (containing alkyl groups, modifiers), 6 g;

polyvinyl alcohol (dispersing agent), 0.1 g.

Graphene and dispersing medium were mixed and stirred by 1000 rad/min at high speed for 20 minutes. A mixture A was obtained by ultrasonic dispersion of 30 minutes. Then, the dispersing agent and the aniline tetramer alkyl derivative were added to the mixture A. After being stirred at a constant temperature of 80 degrees centigrade for 2 hours and precipitated by centrifugation, a mixture B is obtained. A graphene composite powder modified by aniline tetramer alkyl derivative is obtained after being dried at 60 degrees centigrade.

The obtained graphene composite powder were tested for their properties. The method of testing was the same as that of embodiment 1a. The main properties of the obtained graphene composite powder were shown in table 1a.

Controlled Example 1a

A untreated graphene powder is tested. The method of testing is the same as that of embodiment 1a. The main properties of the untreated graphene powder were shown in table 1a.

Controlled Example 1b

Firstly, a graphene powder and silane coupling agent were mixed with 1500 rad/min at high speed for 20 minutes. Then, a mixture was obtained by ultrasonic for 20 minutes. The mixture was dried at 60 degrees centigrade to obtain the graphene powder treated by silane coupling agent.

The graphene powder treated by silane coupling agent was tested. The method of testing was the same as that of embodiment 1a. The main properties of the graphene powder treated by silane coupling agent were shown in table 1a.

TABLE 1a

|  | Embodiment 1a | Embodiment 1b | Controlled example 1a | Controlled example 1b |
| --- | --- | --- | --- | --- |
| surface property | hydrophilic | hydrophilic | not hydrophilic, not oleophylic | hydrophilic |
| stability | no settlement | no settlement | all settlement | all settlement |

It was evident from table 1a, compared to the untreated graphene powder and the graphene powder treated with silane coupling agent, the graphene composite powders of embodiments 1a and 1b had obviously improved dispersion and stability. Through different aniline oligomer derivative and dispersing agent, the surface property of the graphene composite powder can be oleophylic or hydrophilic, which is good for its industrialized application.

Referring to FIG. 1a, compared with the untreated graphene, the graphene composite powder modified by aniline oligomer derivative had an absorption peaks of 1410 $cm^{-1}$, which proves the existence of π-π bond between aniline oligomer derivative and graphene.

Figure 1B:
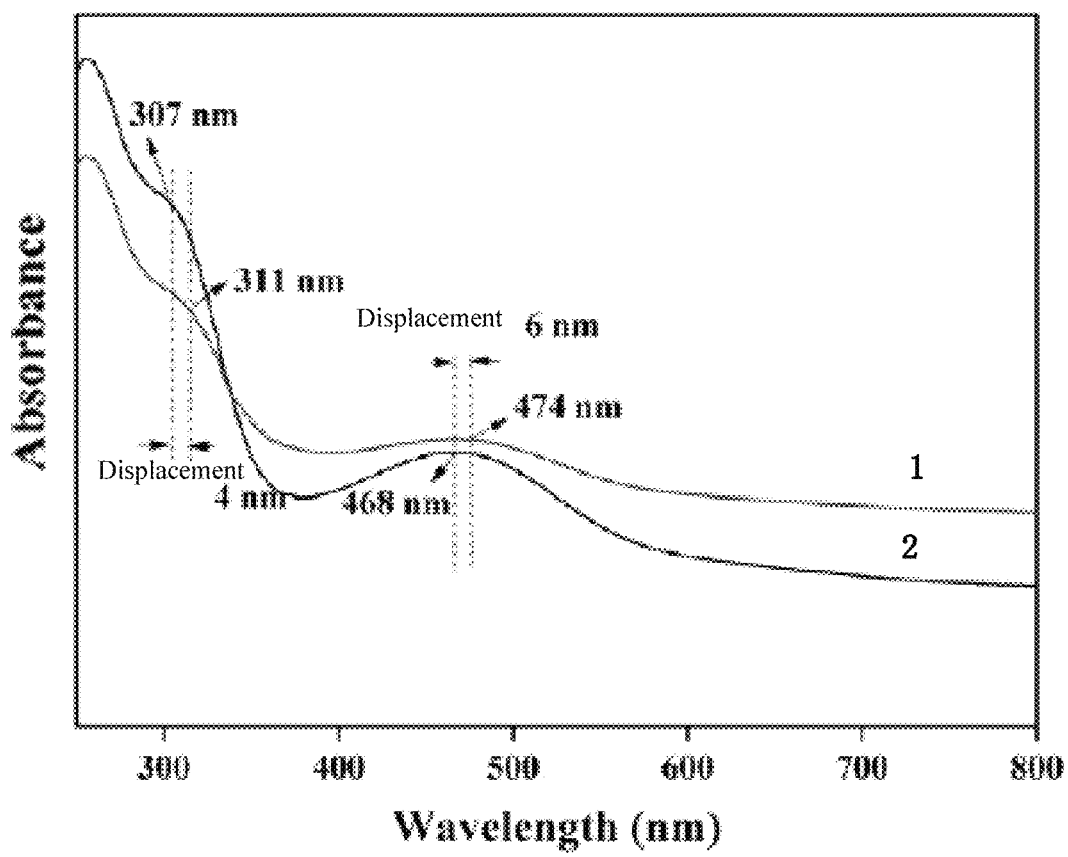
FIG. 1b is ultraviolet-visible (UV-Vis) spectra of the graphene composite powder of embodiment 1a and aniline trimer carboxylic acid derivative, wherein curve 1 is corresponding to the graphene composite powder of embodiment 1a, and curve 2 is corresponding to aniline trimer carboxylic acid derivative.

Furthermore, the graphene composite powder of embodiment 1a and aniline trimer carboxylic acid derivative were detected by UV-Vis spectra. The results were shown in FIG. 1b. The π-π bond of the aniline trimer carboxylic acid derivative itself had two distinct absorption peaks at 307 nm and 474 nm. The absorption peak of the graphene composite powder was shifted (to 311 nm and 468 nm), which further confirmed the existence of π-π bond between aniline trimer carboxylic acid derivative and graphene, resulting the shift of the absorption peaks.

The present disclosure also provides a method for making a graphene slurry. The method for making a graphene slurry comprising the following steps:

S31, dispersing a graphene material in a dispersing medium A1, and obtaining a mixture B1. The property of the graphene material is said in the above, and it will not be said in below. The dispersing medium A1 can be water, ethanol, acetone, isopropyl alcohol, butyl alcohol, ethyl acetate, toluene, chloroform, N,N-dimethylformamide, dimethyl sulfoxide, dichloroethane, or combinations thereof. A mass ratio of the graphene material and the dispersing medium A1 can be 1:10~1:10000. In order to avoiding when the content of graphene is too low, its application significance is not large, and when the graphite content is too high, the aniline oligomer or aniline oligomer derivative on the dispersion effect is limited, preferably, the mass ratio of the graphene material and the dispersing medium A1 is 1:20~1:1000.

S32, adding a dispersing agent and a graphene dispersant used for combining with the graphene material via π-π bond to the mixture B1, and obtaining a mixture B2, wherein the graphene dispersant comprises aniline oligomer or aniline oligomer derivative, which is an electroactive polymer, the aniline oligomer or aniline oligomer derivative is mixed with the graphene material uniformly and combined with the graphene material via π-π bond.

The property of the aniline oligomer or aniline oligomer derivative is said in the above, and it will not be said in below. It should be explained that the substance with the same names in the invention is not repeated. Preferably, a mass ratio of the aniline oligomer or aniline oligomer derivative and the mixture B1 is (0.01~10):100. More preferably, the mass ratio of the aniline oligomer or aniline oligomer derivative and the mixture B1 is (6~10):100.

The dispersing agent is used to make the graphene material dispersing uniformly. The dispersing agent can be selected from the group consisting of silane coupling agent, polyvinyl alcohol, polyvinyl pyrrolidone, organic modified polysiloxane dipropylene glycol monomethyl ether solution, organic silicon surfactant and/or fluorosurfactant. And a mass ratio of the dispersing agent and the mixture B1 is (0.01~1):100.

S33, drying the mixture B2 and obtaining a graphene composite powder modified by the aniline oligomer or aniline oligomer derivative. In the dried graphene composite powder, the mass percent of the aniline oligomer or aniline oligomer derivative is 0.1%~50%.

S34, dispersing the graphene composite powder in a dispersing medium A2 to obtain the graphene slurry. A mass ratio of the graphene material and the dispersing medium A2 is 1:10~1:10000. Preferably, the mass ratio of the graphene material and the dispersing medium A2 is 1:20~1:1000. The dispersing medium A2 is the same as the dispersing medium A1. It is understood that in order to gain graphene composite powder with better dispersion, another dispersing material can be added. The dispersing material can be modified acrylic acid dispersing agent, polyacrylate dispersant, modified polyester dispersing agent, polyvinyl alcohol dispersing agent, modified polyurethane dispersing agent, and so on.

The present disclosure also provides a graphene slurry obtained by the above mentioned method.

The method for making the graphene slurry is innovate, and can make the graphene composite powder with good dispersion and chemical stability. The graphene material modifed by the aniline oligomer or aniline oligomer derivative has improved dispersibility and chemical stability. The graphene slurry can be easily dispersed in many kinds of mediums or coated on a surface of a base material, which improving the application of graphene.

In order to further describe the present disclosure, methods for making the graphene slurry with different parameters are as follows.

Embodiment 2a (1) The Process for Preparing a Graphene Composite Powder

The quality of each component is as follows: graphene powder (single layer), 2 g; deionized water (dispersing medium A1), 98 g; aniline trimer carboxylic acid derivatives (containing carboxyl groups, modifiers), 1 g; polyvinylpyrrolidone (dispersing agent), 0.05 g. Firstly, graphene and dispersing medium A1 were mixed and stirred by 1500 rad/min at high speed for 20 minutes. A mixture B1 was obtained by ultrasonic dispersion of 20 minutes. Then, the dispersing agent and the aniline trimer carboxylic acid derivative were added to the mixture B1. After being stirred at a constant temperature of 70 degrees centigrade for 2 h and precipitated by centrifugation, a mixture B2 is obtained. A graphene composite powder modified by aniline trimer carboxylic acid derivative is obtained after being dried at 60 degrees centigrade.

(2) The Process for Preparing a Graphene Slurry

The quality of each component is as follows: the above graphene composite powder from step (1), 5 g; ethanol, 94.95 g; modified acrylic dispersant, 0.05 g. The graphene composite powder was added into the ethanol and stirred at high speed for 5 minutes, and then the modified acrylic acid dispersant was added by ultrasonic dispersing for 30 minutes. A graphene slurry was obtained after being treated by a high speed mixer for 1 hour.

Figure 2A:
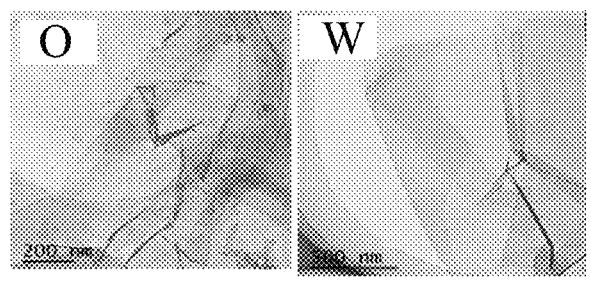
FIG. 2a shows Transmission Electron Microscope (TEM) images of the graphene slurries of embodiment 2a and embodiment 2b, wherein W is corresponding to embodiment 2a, and O is corresponding to embodiment 2b.

The obtained graphene composite powder was tested for the surface property. The obtained graphene slurry was tested for the stability. The main properties of the obtained graphene composite powder and the obtained graphene slurry were shown in table 2a and FIG. 2a.

Embodiment 2b (1) The Process for Preparing a Graphene Composite Powder

The quality of each component is as follows:
graphene (single layer), 1 g;
acetone (dispersing medium A1), 99 g;
aniline pentamer sulfonic acid derivative (containing sulfonic group, modifier), 0.5 g
silane coupling agent (dispersing agent), 0.3 g.

Firstly, graphene and dispersing medium A1 were mixed and stirred by 1500 rad/min at high speed for 10 minutes. A mixture B1 was obtained by ultrasonic dispersion of 20 minutes. Then, the dispersing agent and the aniline pentamer sulfonic acid derivative were added to the mixture B1. After being stirred at a constant temperature of 80 degrees centigrade for 2 h and precipitated by centrifugation, a mixture B2 is obtained. A graphene composite powder modified by aniline pentamer sulfonic acid derivative is obtained after being dried at 70 degrees centigrade.

(2) The Process for Preparing a Graphene Slurry

The quality of each component is as follows:
the above graphene composite powder from step (1), 1 g;
ethyl acetate, 98.9 g;
modified polyester dispersant, 0.1 g.

The graphene composite powder was added into the ethyl acetate and stirred at high speed for 5 minutes, and then the modified polyester dispersant was added by ultrasonic dispersing for 20 minutes. A graphene slurry was obtained after being treated by a high speed mixer for 1 hour.

The obtained graphene composite powder was tested for the surface property. The obtained graphene slurry was tested for the stability. The main properties of the obtained graphene composite powder and the obtained graphene slurry were shown in table 2a and FIG. 2a In order to compare the properties of graphene composite powders of this disclosure, controlled examples 2a and 2b were provided as follows.

Controlled Examples 2a

The quality of each component is as follows: an untreated graphene powder, 0.1 g; toluene, 99 g; a dispersant, 0.9 g. The untreated graphene powder was added to different dispersing mediums A2 and stirred at high speed for 5 minutes, and then the dispersant was added by ultrasonic dispersing for 20 minutes. The dispersing mediums A2 are water, ethanol and tetrahydrofuran. Three graphene slurries were obtained after being treated by a high speed mixer for 1 hour.

The untreated graphene powder was tested for the surface property. The obtained graphene slurries were tested for the stability. The main properties of the untreated graphene powder and the obtained graphene slurries were shown in table 2a and FIG. 2a TABLE 2a (The stability test is that the obtained graphene slurries was stored for 3 months and then observed)

|  | Embodiment 2a | Embodiment 2b | Controlled example 2a |
|---|---|---|---|
| surface property | hydrophilic | oleophylic | not hydrophilic, not oleophylic |
| stability | no settlement | no settlement | all settlement |

It was evident from table 1a, compared to the graphene slurries prepared by the untreated graphene powder, the graphene slurries of embodiments 2a and 2b had obviously improved dispersion and stability. Through different aniline oligomer derivative and dispersing agent, the surface property of the graphene composite powder can be oleophylic or hydrophilic, which is good for its industrialized application.

Figure 2B:
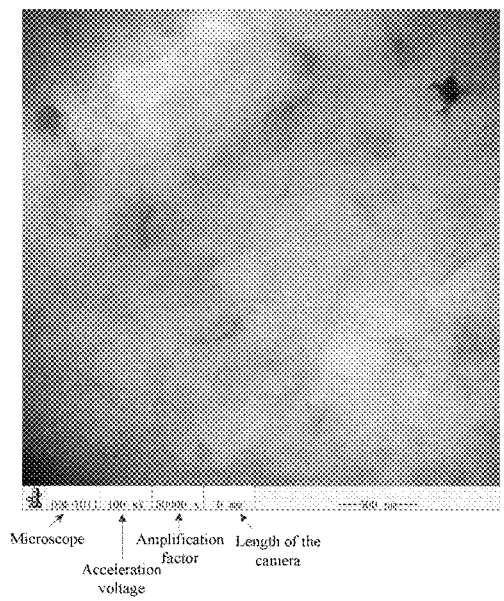

Referring to FIG. 2b, the graphene of the graphene slurry had been dispersed uniformly. Adjacent two graphenes did not been stacked together.

The present disclosure also provides a method for making a graphene painting. The method for making the graphene painting comprising the following steps:

S41, mixing aniline oligomer or aniline oligomer derivative and a dispersing medium, and obtaining a mixture A. The dispersing medium can be water, ethanol, acetone, isopropyl alcohol, butyl alcohol, ethyl acetate, toluene, chloroform, N,N-dimethylformamide, dimethyl sulfoxide, dichloroethane, or combinations thereof. A mass ratio of the aniline oligomer or aniline oligomer derivative and the dispersing medium can be (0.1~10):(80~90). In order to avoiding when the content of the aniline oligomer or aniline oligomer derivative is too low, its dispersing ability is effected, and when its content is too high, its dispersing is effected, preferably, the mass ratio of the aniline oligomer or aniline oligomer derivative and the dispersing medium is (6~10):(80~90).

S42, adding a graphene material to the mixture A, distributing the aniline oligomer or aniline oligomer derivative in the graphene material uniformly, forming π-π bond between the aniline oligomer or aniline oligomer derivative and the graphene material, and obtaining a graphene dispersion.

It can be understand that, after adding the graphene material to the mixture A, the graphene material can be mixed with the mixture A by high speed stirring, ultrasonic dispersion method, ball milling and/or sanding. Then the graphene material can be further mixed with the aniline oligomer or aniline oligomer derivative uniformly.

A mass ratio of the graphene material and the dispersing medium can be (0.1~10):(80~90). That is, a mass percent of the graphene material in the obtained graphene dispersion is 0.1%~10%, a mass percent of the graphene dispersant in the obtained graphene dispersion is 0.1%~10%, and a mass percent of the dispersing medium in the obtained graphene dispersion is 80%~90%. In order to avoiding when the content of graphene is too low, its application significance is not large, and when the graphite content is too high, the aniline oligomer or aniline oligomer derivative on the dispersion effect is limited, preferably, the mass ratio of the graphene material and the dispersing medium can be (0.5~5):(80~90).

S43, providing a painting main-body, mixing the graphene dispersion with painting main-body uniformly, and obtaining a mixture B. The painting main-body can be silicone resin, acrylic resin, polyester resin, polyurethane resin, alkyd resin, epoxy resin, or combinations thereof. A mass ratio of the painting main-body and the graphene dispersion can be (4~6):(3~5). It can be understand that, the graphene dispersion can be can be mixed with the painting main-body by high speed stirring, ultrasonic dispersion method, ball milling and/or sanding. Then the graphene material can be further dispersed in the painting main-body uniformly.

S44, adding a painting agent to the mixture B and obtaining a graphene painting. The painting agent includes a binder, a wetting agent, an antifoaming agent, and a leveling agent. The binder is selected from the group consisting of ethylene glycol monobutyl ether, propylene glycol monobutyl ether, dipropylene glycol methyl ethyl ether, ethylene glycol propyl ether, dipropylene ether, propanediol phenyl ether, benzyl alcohol, and dodecanol ester. the wetting agent is selected from the group consisting of dodecyl sulfate, dodecyl sulfonate, polyvinyl alcohol, polyethylene pyrrolidine, organic silicone compound, and organic fluorine compounds. The antifoaming agent is selected from the group consisting of dimethyl silicone oil, ether ester compound, modified mineral oil, ethoxylated glycerin, small molecule metal organics and modified organo-silicon polymer. And the leveling agent is selected from the group consisting of ethylene glycol butyl ether, cellulose acetate-butyrate, polyacrylic acid esters, silicone oil, hydroxymethyl cellulose, polydimethyl silane, polymethylphenyl sioxane, and modified organo-silicon polymer.

A mass ratio of the painting agent and the graphene dispersion can be (0.3~1):(3~5). That is, a mass percent of the painting main-body in the graphene painting is 40%~60%, a mass percent of the graphene dispersion in the graphene painting is 30%~50%, a mass percent of the painting agent in the graphene painting is 3%~10%. In order to avoiding when the content of the painting agent is too low, it can not disperse the aniline oligomer or aniline oligomer derivative of high percents, and when the content of the painting agent is too high, the property of the graphene material will be effected, preferably, the mass ratio of the painting agent and the graphene dispersion can be (0.3~0.5):(3~5).

The present disclosure also provides a graphene painting. The graphene painting is composed of a painting main-body, a graphene dispersion, and a painting agent. A mass percent of the painting main-body in the graphene painting is 40%~60%. A mass percent of the graphene dispersion in the graphene painting is 30%~50%. A mass percent of the painting agent in the graphene painting is 3%~10%. The graphene dispersion includes a graphene material, a graphene dispersant, and a dispersing medium. The graphene dispersant includes aniline oligomer or aniline oligomer derivative, which is an electroactive polymer. And the graphene material is dispersed uniformly in the painting main-body by forming $\pi$-$\pi$ bond with the aniline oligomer or aniline oligomer derivative.

The graphene powder modfed by the aniline oligomer or aniline oligomer derivative has improved its dispersibility and chemical stability in the above mentioned graphene printing. The graphene painting can be easily attached to sufaces of transparent substrates, such as the front glass of vehicles and architectural glasses. The membrane obtained is transparent, and its heat insulation, and effect of energy saving is remarkable. Moreover, the graphene painting does not contain heavy metals, such as In, Sn, and so on, and does not bring heavy metal pollutions. The method for making the graphene painting is innovate, and can make the graphene painting with good dispersion and chemical stability. The process of the method is simple and costs low, which is good for industrialized application of the graphene painting.

In order to further describe the present disclosure, methods for making the graphene painting with different parameters are as follows.

Embodiment 3a

Firstly, 10 g aniline trimer and 80 g deionized water were mixed with 1500 rad/min at high speed for 10 minutes, and then the mixture A was obtained. Then, 10 g single layer graphene powder was added into the mixture A, and after high speed stirring for 20 minutes and ultrasonic for 10 minutes an even and stable graphene dispersion was obtained.

60 g silicone resin was added to a mixing vessel, and then 35 g graphene dispersion were added to the mixing vessel under 1500 rad/min speed stirring, and a mixture B was obtained. 2 g ethylene glycol monobutyl ether, 2 g dodecyl sulfate, 0.5 g modified mineral oil and 0.5 g silicone oil were added in mixture B, stirred for 10 minutes, and dispersed under ultrasonic for 30 minutes. After being filtered by 325~400 mesh, a graphene printing was obtained.

Figure 3A:
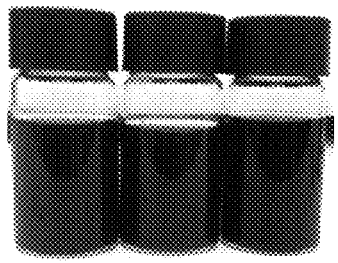
FIG. 3a shows photographs of the graphene dispersions of embodiments 3a~3c, wherein the photographs from left to right are corresponding to embodiments 3a~3c.
Figure 4A:
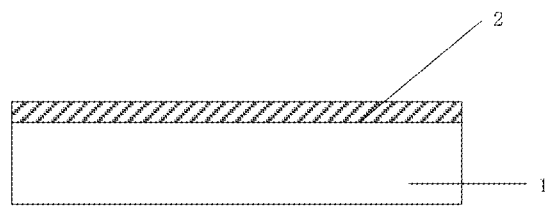
FIG. 4a shows a schematic structural view of an embodiment of a graphene composite membrane, wherein 1 is corresponding to a substrate, and 2 is corresponding to a coating.

The dispersion effect of the graphene dispersion was shown in FIG. 3a. As shown in FIG. 3a, the dispersion effect of the graphene dispersion was good.

The obtained graphene printing was tested for their properties. In detail, the obtained graphene printing was coated on a 10 cm*10 cm*0.2 cm flat glass sheet with a 10 μm wire rod coater, and then dried in an oven of 80 degrees centigrade for 1 hour to obtain a graphene film.

The visible light transmittance, infrared light transmittance and UV light barrier rate of the obtained graphene film was detected by UV-Vis infrared spectrophotometer based on GB/T 2680.

The adhesion of the obtained graphene film was detected by GB/T 9286 according to the scoring method.

The water resistance of the obtained graphene film was tested according to GB/T 1733 by being soaked at room temperature and the test time was 96 hours.

The artificial weathering machine was used to test the artificial weathering ability of the obtained graphene film according to GB/T 1865, and the test time was 1000 hours.

The temperature resistance of the obtained graphene film was tested by GB/T 1735, by alternate test of cold and heat resistance.

The main properties of the obtained graphene film were shown in table 3a.

Embodiment 3b

Firstly, 9.9 g aniline tetramer and 90 g ethanol were mixed with 1500 rad/min at high speed for 10 minutes, and then the mixture A was obtained. Then, 0.1 g multilayer graphene powder was added into the mixture A, and after high speed stirring for 20 minutes and ultrasonic for 10 minutes an even and stable graphene dispersion was obtained.

52 g acrylic resin was added to a mixing vessel, and then 35 g the ontained graphene dispersion was added to the mixing vessel and stirred under 1500 rad/min speed, and a mixture B was obtained. 1 g dipropylene glycol methyl ether ethyl ether ester, 1 g dodecyl sulfonate, 0.5 g dimethyl silicone oil and 0.5 g hydroxymethyl cellulose were added in the mixture B, stirred for 10 minutes, and dispersed under ultrasonic for 30 minutes. After being filtered by 325~400 mesh, a graphene printing was obtained.

The dispersion effect of the graphene dispersion was shown in FIG. 3a. As shown in FIG. 3a, the dispersion effect of the graphene dispersion was good.

The obtained graphene printing were tested for their properties. The methods of testing were same as the methods in embodiment 3a. The main properties of a graphene film made from the obtained graphene printing were shown in table 3a.

Embodiment 3c

Firstly, 0.1 g aniline pentamer and 90 g acetone were mixed with 1500 rad/min at high speed for 10 minutes, and then the mixture A was obtained. Then, 9.9 g single layer graphene slurry was added into the mixture A, and after high speed stirring for 20 minutes and ultrasonic for 10 minutes an even and stable graphene dispersion was obtained.

55 g polyester resin was added to a mixing vessel, and then 40 g the ontained graphene dispersion was added to the mixing vessel and stirred under 1500 rad/min speed, and a mixture B was obtained. 2 g glycol propyl ether, 2 g polyvinyl alcohol, 0.5 g ether ester compound and 0.5 g polyacrylate were added in the mixture B, stirred for 10 minutes, and dispersed under ultrasonic for 30 minutes. After being filtered by 325~400 mesh, a graphene printing is obtained.

The dispersion effect of the graphene dispersion was shown in FIG. 3a. As shown in FIG. 3a, the dispersion effect of the graphene dispersion was good.

The obtained graphene printing were tested for their properties. The methods of testing were same as the methods in embodiment 3a. The main properties of a graphene film made from the obtained graphene printing were shown in table 3a.

TABLE 3a

|  | Embodiment 3a | Embodiment 3b | Embodiment 3c |
|---|---|---|---|
| visible light transmittance | 91% | 94% | 93% |
| infrared light transmittance | 7% | 12% | 10% |
| UV light barrier rate | 99% | 98% | 99% |
| water resistance | no abnormalities | no abnormalities | no abnormalities |
| artificial weathering ability | no abnormalities | no abnormalities | no abnormalities |
| adhesion | 0 level | 0 level | 0 level |
| temperature resistance | no abnormalities | no abnormalities | no abnormalities |

As shown in Table 3a, graphene films made from the obtained graphene printing had high visible light transmittance and almost completely shielding ultraviolet light, and could effectively block the infrared light of higher energy in sunlight. The graphene films had good artificial weathering ability, good water resistance, good adhesion, and good temperature resistance.

The present disclosure also provides a method for making a graphene composite membrane, comprising the following steps:

S51, mixing aniline oligomer or aniline oligomer derivative and a dispersing medium, and obtaining a mixture A, wherein the aniline oligomer or aniline oligomer derivative is an electroactive polymer;

S52, adding a graphene material to the mixture A, distributing the aniline oligomer or aniline oligomer derivative in the graphene material uniformly, forming π-π bond between the aniline oligomer or aniline oligomer derivative and the graphene material, and obtaining a graphene dispersion;

S53, providing a painting main-body, mixing the graphene dispersion with painting main-body uniformly, and obtaining a mixture B;

S54, adding a painting agent to the mixture B and obtaining a graphene composite painting; and S55, coating the graphene composite painting on a substrate and obtaining a graphene composite membrane after drying, wherein a mass percent of the painting main-body in the graphene composite painting is 40%~60%, a mass percent of the graphene dispersion in the graphene painting is 30%~50%, a mass percent of the painting agent in the graphene painting is 3%~10%.

In the method for making the graphene composite membrane, the content of steps S51 to S54 is the same as the content of the steps S41 to S44 in the above mentioned method for making the graphene composite printing, and no further details are given here.

In step S55, the graphene composite printing is coated on a substrate 1, and a graphene composite membrane is obtained after being dried. In detail, the graphene composite printing can be coated on a substrate 1 by spraying, scraping, brushing, showering, or roll coating to form a coating 2 on the surface of the substrate 1.

The substrate is a thin film made from polyethylene (PE), polypropylene (PP), polyhexamethylene adipamide (PA), polyvinyl chloride (PVC), polyethylene terephthalate (PET), or polymethyl methacrylate (PMMA). The substrate can be rinsed by deionized water, ethanol, and so on, to make the surface of the substrate clean.

The graphene modfied by the aniline oligomer or aniline oligomer derivative has improved its dispersibility and chemical stability in the above mentioned graphene composite membrane. The graphene composite membrane can be easily attached to sufaces of transparent substrates, such as the front glass of vehicles and architectural glasses. The graphene composite membrane obtained is transparent, and its adhesion, artificial weathering ability, and heat insulation is remarkable. Moreover, the graphene composite membrane does not contain heavy metals, such as In, Sn, and so on, and does not bring heavy metal pollutions. The method for making the graphene composite membrane has simple process, convenient construction, and easy to operate, which can be widely used for building glass and glasses of car, train, aircraft and other transportation having a need of energy saving in other fields.

In order to further describe the present disclosure, methods for making the graphene composite membrane with different parameters are as follows.

Embodiment 4a

Firstly, 10 g aniline trimer and 80 g deionized water were mixed with 1500 rad/min at high speed for 10 minutes, and then the mixture A was obtained. Then, 10 g single layer graphene powder was added into the mixture A, and after high speed stirring for 20 minutes and ultrasonic for 10 minutes an even and stable graphene dispersion was obtained.

60 g silicone resin was added to a mixing vessel, and then 35 g graphene dispersion were added to the mixing vessel under 1500 rad/min speed stirring, and a mixture B was obtained. 2 g ethylene glycol monobutyl ether, 2 g dodecyl sulfate, 0.5 g modified mineral oil and 0.5 g silicone oil were added in mixture B, stirred for 10 minutes, and dispersed under ultrasonic for 30 minutes. After being filtered by 325~400 mesh, a graphene composite printing was obtained.

The obtained graphene composite printing was coated on a transparent PMMA film by scraping coating, and a graphene composite membrane was obtained.

The obtained graphene composite membrane was tested for their properties. In detail, the visible light transmittance, infrared light transmittance and UV light barrier rate of the obtained graphene composite membrane was detected by UV-Vis infrared spectrophotometer based on GB/T 2680.

The adhesion of the obtained graphene composite membrane was detected by GB/T 9286 according to the scoring method.

The water resistance of the obtained graphene composite membrane was tested according to GB/T 1733 by being soaked at room temperature and the test time was 96 hours.

The artificial weathering machine was used to test the artificial weathering ability of the obtained graphene composite membrane according to GB/T 1865, and the test time was 1000 hours.

The temperature resistance of the obtained graphene composite membrane was tested by GB/T 1735, by alternate test of cold and heat resistance.

The test results of the properties of the obtained graphene composite membrane were as follows: visible light transmittance was 91%; infrared light transmittance was 7%; UV light barrier rate was 99%; water resistance was up to 96 hours; artificial weathering ability was up to 1000 hours; and adhesion was 0 level.

Embodiment 4b

Firstly, 9.9 g aniline tetramer and 90 g ethanol were mixed with 1500 rad/min at high speed for 10 minutes, and then the mixture A was obtained. Then, 0.1 g multilayer graphene powder was added into the mixture A, and after high speed stirring for 20 minutes and ultrasonic for 10 minutes an even and stable graphene dispersion was obtained.

52 g acrylic resin was added to a mixing vessel, and then 35 g the ontained graphene dispersion was added to the mixing vessel and stirred under 1500 rad/min speed, and a mixture B was obtained. 1 g dipropylene glycol methyl ether ethyl ether ester, 1 g dodecyl sulfonate, 0.5 g dimethyl silicone oil and 0.5 g hydroxymethyl cellulose were added in the mixture B, stirred for 10 minutes, and dispersed under ultrasonic for 30 minutes. After being filtered by 325~400 mesh, a composite graphene printing was obtained.

The obtained graphene composite printing was coated on a transparent PP film by spraying, and a graphene composite membrane was obtained.

The obtained graphene composite membrane was tested for their properties. The methods of testing were same as the methods in embodiment 4a. The test results of the properties of the obtained graphene composite membrane were as follows: visible light transmittance was 94%; infrared light transmittance was 12%; UV light barrier rate was 98%; water resistance was up to 96 hours; artificial weathering ability was up to 1000 hours; and adhesion was 0 level.

So, the graphene composite membranes of embodiment 4a and 4b had high visible light transmittance and almost completely shielding ultraviolet light, and could effectively block the infrared light of higher energy in sunlight. The graphene composite membranes had good artificial weathering ability, good water resistance, good adhesion, and good temperature resistance.

The present disclosure also provides a method for making a graphene composite paper. The method for making a graphene composite paper comprises the following steps.

S61, dispersing a graphene material in a dispersing medium, and obtaining a mixture A3.

S62, adding a dispersing agent and a graphene dispersant used for combining with the graphene material via π-π bond to the mixture A3, and obtaining a mixture B3, wherein the graphene dispersant comprises aniline oligomer or aniline oligomer derivative, which is an electroactive polymer, the aniline oligomer or aniline oligomer derivative is mixed with the graphene material uniformly and combined with the graphene material via π-π bond.

S63, immersing a micro-porous membrane in the mixture B3 for 1 minute to 10 minutes and obtaining a graphene/membrane complex after drying. The micro-porous membrane takes a role of a template and a carrier, so that the obtained graphene composite paper has a definite shape and size. The micro-porous membrane can be a polymer membrane with a plurality of penetrating holes. The diameter of the plurality of penetrating holes can be 10 nanometers to 1000 micrometers. The polymer membrane can be selected from the group consisting of polyethylene (PE), polypropylene (PP), polystyrene (PS), polymethyl methacrylate (PMMA), polyvinyl chloride (PVC), nylon, polycarbonate (PC), polyurethane (PU), polytetrafluoroethylene (PTFE), or polyethylene terephthalate (PET).

S64, carbonizing the graphene/membrane complex in a carbonizing oven at carbonization temperature, and obtaining a graphene composite paper. The carbonization temperature is 800 degrees centigrade to 1400 degrees centigrade. And the time of carbonizing is 1 hour to 3 hours.

In the method for making the graphene composite paper, the graphene composite paper is obtained by immersing in the graphene dispersion and using a filter paper or micro-porous membrane as the base. The process of the method is simple, the cost is low, and is suitable for industrial production in large scale. In addition, the graphene in the method is deposited on the surface and pores of the micro-porous membrane, and a woven structure is formed. The strength and flexibility of graphene composite paper of the above method is better greater than that of other methods, so as to facilitate its application in flexible electronics.

In order to further describe the present disclosure, methods for making the graphene composite paper with different parameters are as follows.

Embodiment 5a 2 g single layer graphene powder was added to 98 g deionized water. A mixture A3 was obtained by stirring by 1500 rad/min at high speed for 20 minutes and ultrasonic dispersing for 20 minutes. Then, 0.05 g polyvinylpyrrolidone and 1 g aniline trimer carboxylic acid derivative were added to the mixture A3. After being ultrasonic dispersed for 20 minutes and stirred at high speed for 1 h, a mixture B3 is obtained. A porous PE film with a thickness of 35 μm was immersed in the mixture B3, and a graphene composite PE film was obtain after immersing for 1 minute and drying. The graphite PE composite membrane is carbonized at 800 degrees centigrade in a carbonization furnace and a composite graphene paper with a thickness of 37 μm was obtained.

The performances of the graphene composite paper were tested. The test results showed that the conductivity of the composite graphene paper was $1.3*10^5$ S/m, and the tensile strength was 221 MPa.

Figure 5A:
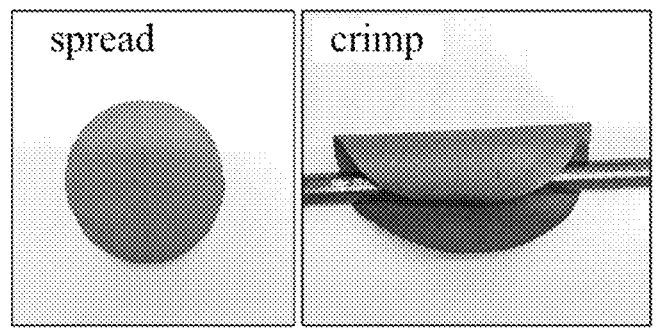

As shown in FIG. 5a, the graphene composite paper had good flexibility and could be able to be curled.

The present disclosure also provides a method for making a graphene composite painting. The method for making a graphene composite painting comprises the following steps.

S71, dispersing aniline oligomer and a graphene material in a dispersing solvent, mixing the aniline oligomer and the graphene material uniformly, forming π-π bond between the aniline oligomer and the graphene material, and obtaining a graphene dispersion.

S72, providing a resin, adding the graphene dispersion to the resin, mixing the graphene dispersion and the resin uniformly, and obtaining a mixture A4. The graphene dispersion can be evenly dispersed in the resin by way of high-speed agitation, ultrasonic, ball milling and/or sanding, which further makes graphene disperse in the resin evenly. The resin can be epoxy resin, acrylic resin, polyurethane resin, acrylic polyurethane resin, amino resin, or combination thereof.

S73, adding a painting agent to the mixture A4, and obtaining a graphene composite painting. The painting agent comprises an anti-settling agent, an antifoaming agent, and a leveling agent. The anti-settling agent can be fumed silica, polyamide wax, organic bentonite, or combination thereof. The antifoaming agent can be dimethyl silicone oil, ether ester compound, modified mineral oil, ethoxylated glycerin, small molecule metal organics, modified organo-silicon polymer, or combination thereof. And the leveling agent can be ethylene glycol butyl ether, cellulose acetate-butyrate, polyacrylic acid esters, silicone oil, hydroxymethyl cellulose, polydimethyl silane, polymethylphenyl sioxane, modified organo-silicon polymer, or combination thereof. It is also understood that the graphene composite printing can include a curing agent. The curing agent can be a polyamide used for accelerating the curing process of the graphene composite printing.

A mass percent of the graphene material in the graphene composite painting is 0.01%~5%. Preferably, the mass percent of the graphene material in the graphene composite painting is 0.2%~5%.

The present disclosure also provides a graphene composite painting made by the above mentioned method. The graphene composite painting is consisted of a resin, a graphene material, aniline oligomer, a dispersing solvent, and a painting agent. The mass percent of the graphene material in the graphene composite painting is 0.01%~5%. The graphene material can be dispersed in the resin uniformly via forming π-π bond with the aniline oligomer.

In the graphene composite painting, the graphene material modifed by the aniline oligomer has improved dispersibility and chemical stability. The graphene material can be easily dispersed in the resin. For the reason that the graphene has good hydrophobic property, it can effectively inhibit the adsorption of water molecules on the surface of the graphene composite printing. Besides, graphene has a two-dimensional layer structure and can disperse in the graphene composite painting evenly. When forming a graphene composite coating preparing by the graphene composite printing, graphene can be stacked together and forming an dense insulating layer. Thus, the corrosion medium of small molecules (eg. water molecules, chloride ion) is difficult to cross the dense insulating layer. The dense insulating layer plays a role of a physical isolator. That is, the prepared graphene composite coating has a good water permeability, strong protection ability, and excellent corrosion protection effect. Moreover, the graphene composite painting does not contain heavy metals, such as In, Sn, and so on, and does not bring heavy metal pollutions. The method for making the graphene composite painting is innovate, and can make the graphene composite painting having good dispersion and chemical stability. The process of the method is simple and costs low, which is good for industrialized application of the graphene composite painting.

In order to further describe the present disclosure, methods for making the graphene composite painting with different parameters are as follows.

Embodiment 6a 2.0 g aniline tetramer and 1.0 g graphene were added in 1.0 L toluene solution for ultrasonic dispersing for 1 hour. A graphene dispersion was obtained. The content of the graphene modified by aniline tetramer reached to 1 g/L.

The graphene dispersion was added to the 46 g epoxy resin (model E44, purchased from Jiangsu Wujiang Heli Resin Factory) and mixed to gain a mixture of A4. Then 1 g leveling agent, 1 g antifoaming agent, 1 g anti-settling agent and 46 g curing agent of polyamide were successively added to the mixture A4. And a graphene composite painting was obtained after being stirred evenly.

The obtained graphene composite painting was applied to a substrate of carbon steel. And a graphene composite coating is obtained after volatilization of toluene.

In order to compare the experimental results, a controlled example 3a of epoxy resin coating was provided. The preparation of the epoxy resin coating of controlled example 3a was the same as the embodiment 6a, but only the graphite dispersion was not added.

The graphene composite coating of embodiment 6a and the epoxy resin coating of controlled example 3a were tested for corrosion resistance. In detail, the graphene composite coating of embodiment 6a and the epoxy resin coating of controlled example 3a were immersed in NaCl solution with 3.5 weight percent for 8 days. Using Shanghai Chen Hua CHI660E electrochemical workstation, AC impedance spectra (see FIG. 6b to FIG. 6e) and polarization curves (see FIG. 6f) of the graphene composite coating and the epoxy resin coating, respectively. As shown in FIG. 6b to FIG. 6e and FIG. 6f, the graphene composite coating has a higher impedance than the epoxy resin coating. After immersion for 8 days, the self etching current density of the graphene composite coating was 5.23 nA·cm$^{-2}$, while the self etching current density of the epoxy resin coating was 158 nA·cm$^{-2}$. It was showed that the graphene modified by aniline oligomer can be evenly dispersed in the resin, thus the corrosion resistance of the graphene composite coating was greatly improved.

The graphene composite coating of embodiment 6a and the epoxy resin coating of controlled example 3a were tested for water-tolerant permeability. In detail, the AC impedance values were fitted, the lgQ$_c$ (Q$_c$ is capacitor of the coating) was plotted on the t$^{1/2}$, and FIG. 6g was obtained. Through linear fitting, linear regression equations of the graphene composite coating and the epoxy resin coating were obtained. And the diffusion coefficients of the graphene composite coating and the epoxy resin coating were calculated to $6.35*10^{-11}$ m²/d and $9.1*10^{-12}$ m²/d, respectively. It was proved that the graphene modified by aniline oligomer could be uniformly dispersed in the resin, thus slowing the diffusion rate of water molecules in the graphene composite coating.

Figure 6A:
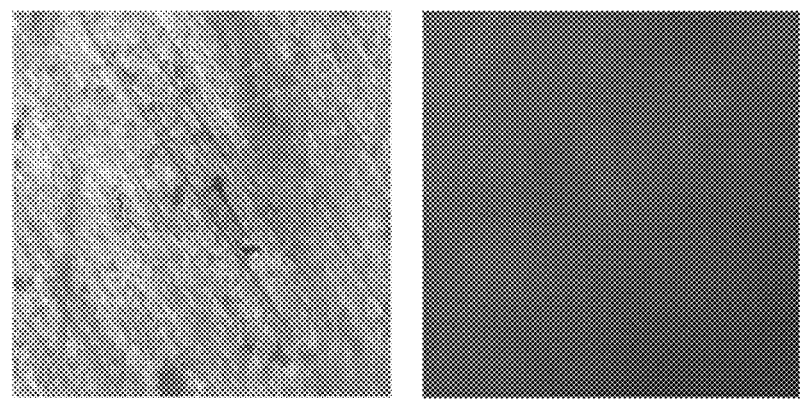
FIG. 6a shows surface images of pure polyurethanes coating of controlled example 3b and graphene composite coating of embodiment 6b after salt spray test for 500 hours.
Figure 6B:
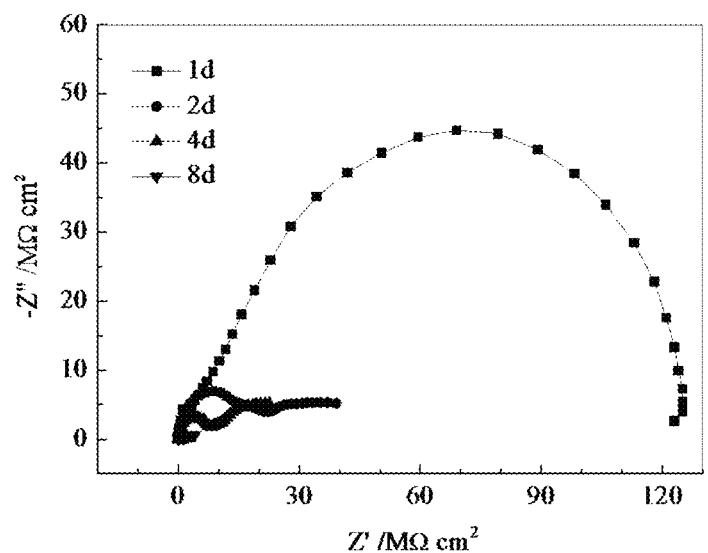
FIG. 6b is an impedance complex plane of Alternating Current (AC) impedance spectrum of epoxy resin coating of controlled example 3a immersing in NaCl solution with 3.5 weight percent for 8 days.
Figure 6C:
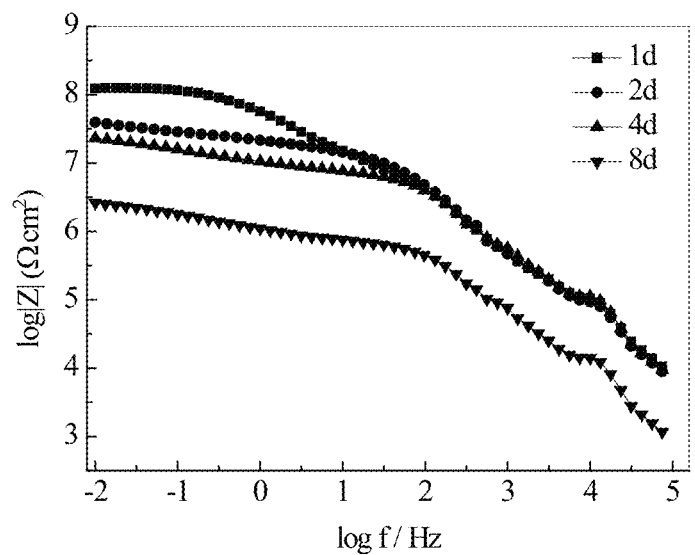
FIG. 6c is a bode plot of AC impedance spectrum of epoxy resin coating of controlled example 3a immersing in NaCl solution with 3.5 weight percent for 8 days.
Figure 6D:
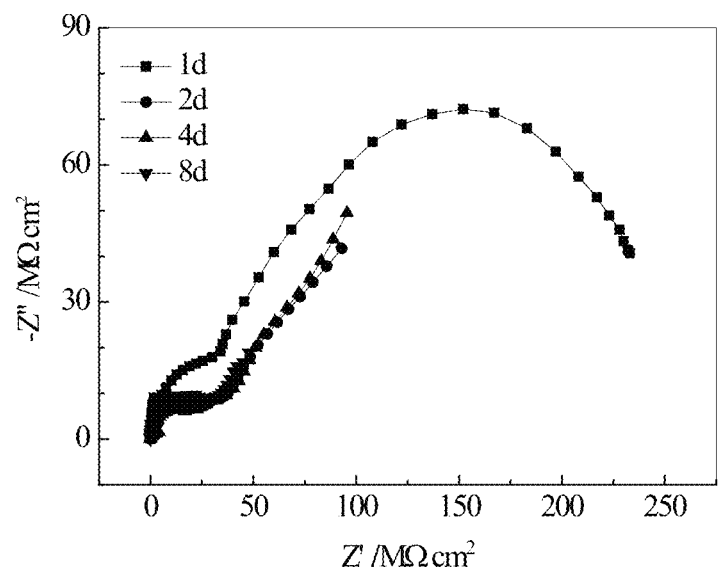
FIG. 6d is an impedance complex plane of AC impedance spectrum of graphene composite coating of embodiment 6a immersing in NaCl solution with 3.5 weight percent for 8 days.
Figure 6E:
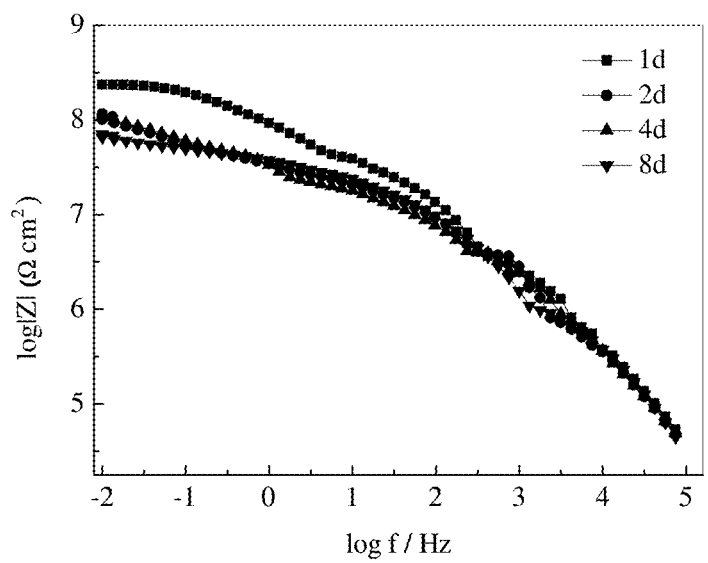
FIG. 6e is a bode plot of AC impedance spectrum of graphene composite coating of embodiment 6a immersing in NaCl solution with 3.5 weight percent for 8 days.
Figure 6F:
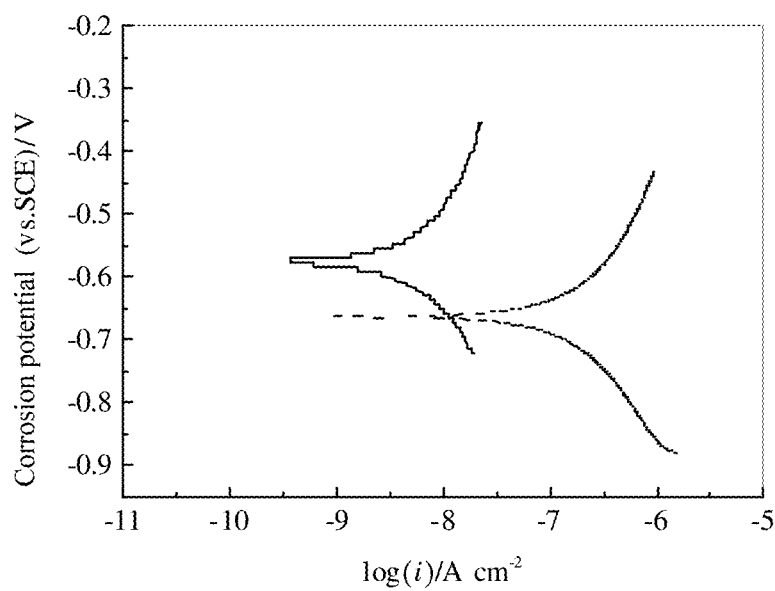
Figure 6G:
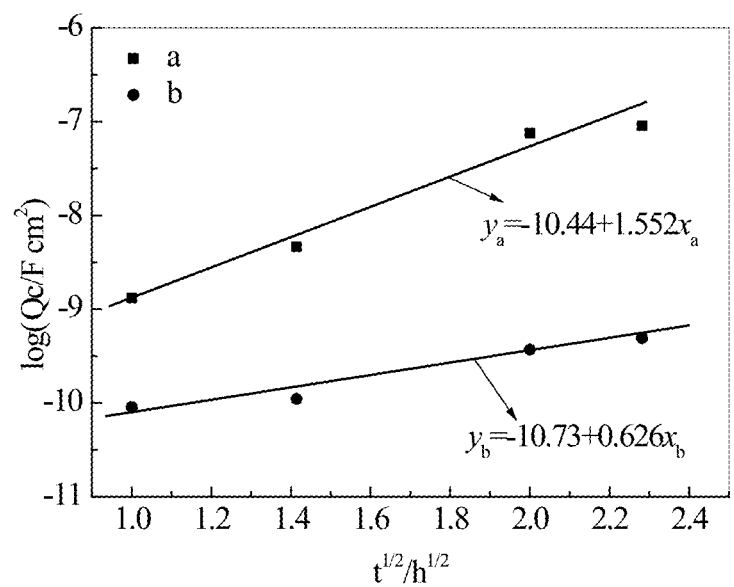
FIG. 6g is $lgQ_c$-$t^{1/2}$ curves and equation of linear regressions of graphene composite coating of embodiment 6a and epoxy resin coating of controlled example 3a immersing in NaCl solution with 3.5 weight percent for 8 days, wherein curve a is corresponding to controlled example 3a, curve b is corresponding to embodiment 6a, Qc is capacitance of coating, and t is test time.
Figure 6H:
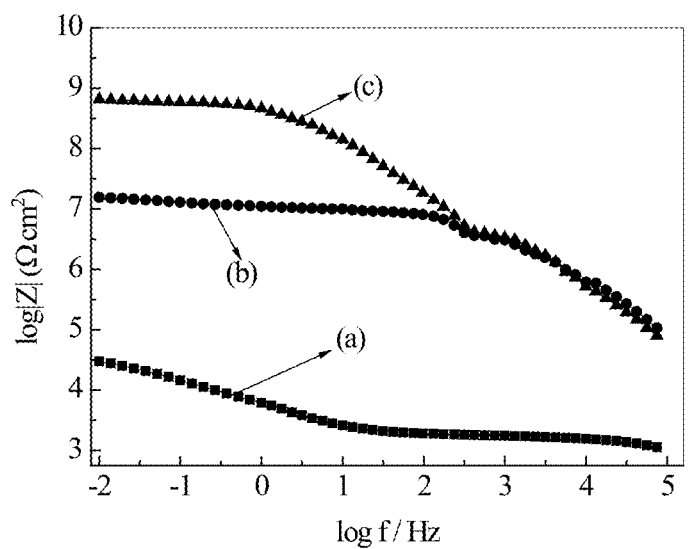

The graphene composite coating, pure epoxy resin coating, and market epoxy zinc rich coating were immersed in NaCl solution with 3.5 weight percent for 8 days, and the AC impedance spectroscopies were compared (see FIG. 6h). As shown in FIG. 6h, it is found that the graphene composite coating had the best anti-corrosion effect.

Embodiment 6b 1.5 g aniline trimer and 1.5 g graphene were dispersed in 1.0 L toluene solution for ultrasonic dispersing for 1 hour. A graphene dispersion was obtained. The content of the graphene modified by aniline trimer reached to 1.5 g/L.

The graphene dispersion was added to the 90 g polyurethane (purchased from Ningbo Feilun paint making Co., Ltd.) and mixed to obtain a mixture A4. Then 2 g leveling agent, 3 g antifoaming agent, and 2 g anti-settling were successively added to the mixture A4. And a graphene composite painting was obtained after being stirred evenly.

The obtained graphene composite painting was applied to a substrate of carbon steel. And a graphene composite coating is obtained after volatilization of toluene.

In order to compare the experimental results, a controlled example 3b of pure PU coating was provided. The preparation of the pure PU coating of controlled example 3b was the same as the embodiment 6b, but only the graphite dispersion is not added.

The graphene composite coating of embodiment 6b and the pure PU coating of controlled example 3b were tested for salt spray resistance. In detail, the graphene composite coating and the pure PU coating of controlled example 3b were respectively placed in a salt fog test for 1000 hours, and dried at room temperature for taking pictures (see FIG. 6a). As shown in FIG. 6a, the surface of the pure PU coating had obvious corrosion pits, while the surface of the graphene composite coating had no obvious corrosion phenomenon.

The present disclosure also provides a method for making a water-soluble graphene composite painting. The method for making the water-soluble graphene composite painting includes the following steps.

S81, dissolving equal molar quantity of aniline oligomer derivative and a base in water, and obtaining a mixture A5. The purpose of adding the base is to make the aniline oligomer derivatives better dissolving in water. The limit of equal molar quantity is that the groups of carboxylic acid or other acid in the structure of the aniline oligomer derivatives can be neutralized completely with the base. The base is sodium hydroxide, triethyl amine, potassium hydroxide, ammonia, or combination thereof.

The aniline oligomer derivative and the base are dispersed in water, so that the aniline oligomer derivative can be fully dissolved. The aniline oligomer derivative is used to modify the graphene.

S82, adding a graphene material to the mixture A5, mixing the aniline oligomer derivative and the graphene material uniformly, forming π-π bond between the aniline oligomer derivative and the graphene material, and obtaining a graphene dispersion. A mass ratio of the aniline oligomer derivative and the graphene material can be 1:10~10:1. Preferably, the mass ratio of the aniline oligomer derivative and the graphene material can be 2:1~1:1.

S83, providing a water-soluble resin, adding the graphene dispersion to the water-soluble resin, mixing the graphene dispersion and the water-soluble resin uniformly, and obtaining a mixture B5. The graphene dispersion can be evenly dispersed in the water-soluble resin by way of high-speed agitation, ultrasonic, ball milling and/or sanding, which further makes graphene disperse in the water-soluble resin evenly. The water-soluble resin can be water-soluble epoxy resin, water-soluble acrylic resin, water-soluble polyurethane resin, water-soluble acrylic polyurethane resin, water-soluble amino resin, or combination thereof.

S84, adding a painting agent to the mixture B5, and obtaining a water-soluble graphene composite painting. The painting agent comprises an anti-settling agent, an antifoaming agent, and a leveling agent. The anti-settling agent can be fumed silica, polyamide wax, organic bentonite, or combination thereof. The antifoaming agent can be dimethyl silicone oil, ether ester compound, modified mineral oil, ethoxylated glycerin, small molecule metal organics, modified organo-silicon polymer, or combination thereof. And the leveling agent can be ethylene glycol butyl ether, cellulose acetate-butyrate, polyacrylic acid esters, silicone oil, hydroxymethyl cellulose, polydimethyl silane, polymethylphenyl sioxane, modified organo-silicon polymer, or combination thereof. It is also understood that the water-soluble graphene composite printing can include a water-soluble curing agent. The water-soluble curing agent can be a water-soluble polyamide used for accelerating the curing process of the water-soluble graphene composite printing.

A mass percent of the graphene in the water-soluble graphene composite painting is 0.01%~4%. Preferably, the mass percent of the graphene material in the water-soluble graphene composite painting is 0.2%~1.0%.

The present disclosure also provides a water-soluble graphene composite painting made by the above mentioned method. The water-soluble graphene composite painting is consisted of a water-soluble resin, a graphene material, aniline oligomer derivative, water, and a painting agent. The mass percent of the graphene material in the water-soluble graphene composite painting is 0.01%~4%. Preferably, the mass percent of the graphene material in the water-soluble graphene composite painting is 0.2%~1.0%. The graphene material can be dispersed in the water-soluble resin uniformly via forming π-π bond with the aniline oligomer derivative.

In the water-soluble graphene composite painting, the graphene material modfed by the aniline oligomer derivative has improved dispersibility and chemical stability. The graphene material can be easily dispersed in the water-soluble resin. For the reason that the graphene has good hydrophobic property, it can effectively inhibit the adsorption of water molecules on the surface of the graphene composite printing. Besides, graphene has a two-dimensional layer structure and can disperse in the water-soluble graphene composite painting evenly. When forming a water-soluble graphene composite coating preparing by the graphene composite printing, graphene can be stacked together and forming an dense insulating layer. Thus, the corrosion medium of small molecules (eg. water molecules, chloride ion) is difficult to cross the dense insulating layer. The dense insulating layer plays a role of a physical isolator. That is, the prepared water-soluble graphene composite coating has a good water permeability, strong protection ability, and excellent corrosion protection effect. Moreover, the water-soluble graphene composite painting does not contain heavy metals, such as In, Sn, and so on, and does not bring heavy metal pollutions. The method for making the water-soluble graphene composite painting is innovate, and can make the water-soluble graphene composite painting having good dispersion and chemical stability. The process of the method is simple and costs low, which is good for industrialized application of the water-soluble graphene composite painting.

In order to further describe the present disclosure, methods for making the water-soluble graphene composite painting with different parameters are as follows.

Embodiment 7a 2.0 g aniline trimer was dissolved in 50 mL THF, and then 1.04 g succinic anhydride was added and reacted with the aniline trimer for 3 hours. An aniline trimer carboxyl derivative were obtained by precipitation with petroleum ether.

2.0 g aniline trimer carboxyl derivative and 0.33 g NaOH solid were dissolved in 10 mL water, and a mixture A5 was obtained. 2 g graphene ((purchased from Ningbo Moxi Technology Co. Ltd.) was added in the mixture A5 for ultrasonic dispersing for 1 hour. A graphene dispersion was obtained. The content of the graphene modified by aniline trimer carboxyl derivative reached to 0.2 g/mL in water.

The graphene dispersion was added to the 45 g water-soluble epoxy resin (purchased from Xibei Yongxin Group Ltd.) and mixed to gain a mixture of B5. Then 1 g leveling agent, 2 g antifoaming agent, 2.67 g anti-settling agent and 45 g curing agent of water-soluble polyamide were successively added to the mixture B5. And a water-soluble graphene composite painting was obtained after being stirred evenly.

The obtained water-soluble graphene composite painting was applied to a substrate of carbon steel. And a water-soluble graphene composite coating is obtained after volatilization of water.

In order to compare the experimental results, a controlled example 4a of water-soluble epoxy resin coating was provided. The preparation of the water-soluble epoxy resin coating of controlled example 4a was the same as the embodiment 7a, but only the graphite dispersion was not added.

Figure 7A:
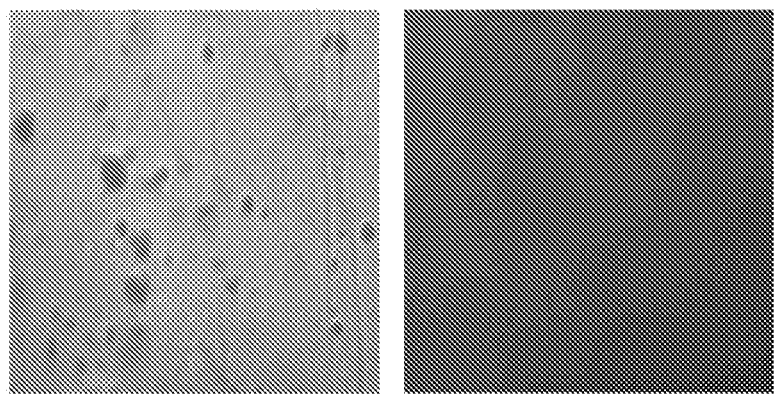
Figure 7B:
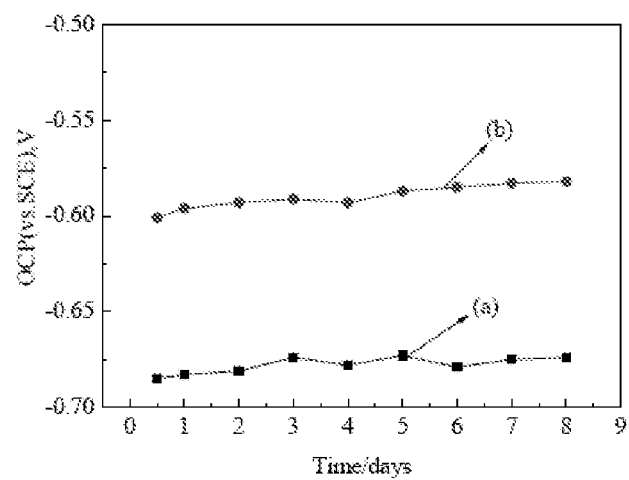
Figure 7C:
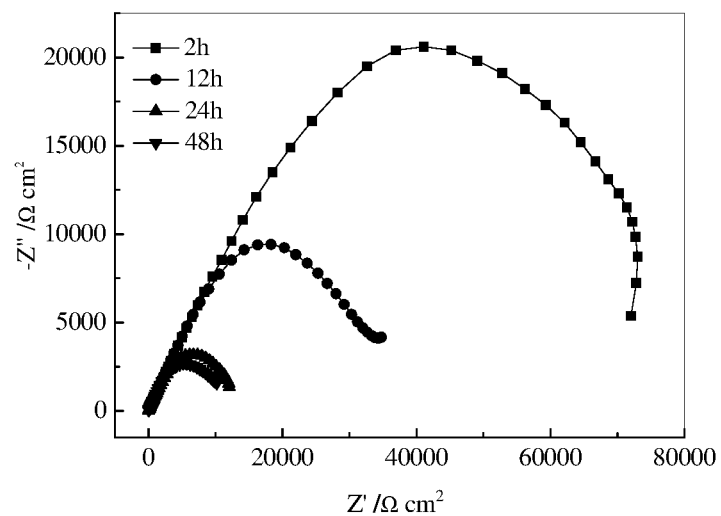
FIG. 7c is an impedance complex plane of AC impedance spectrum of water soluble epoxy resin coating of controlled example 4a immersing in NaCl solution with 3.5 weight percent for 48 hours.
Figure 7D:
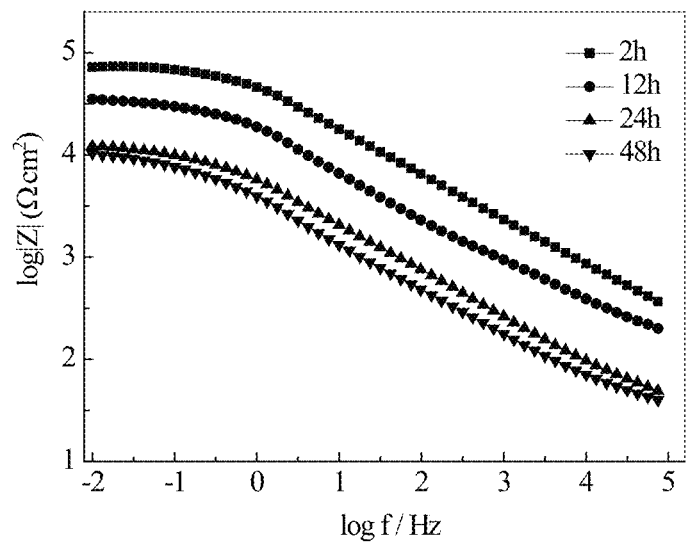
FIG. 7d is a bode plot of AC impedance spectrum of water soluble epoxy resin coating of controlled example 4a immersing in NaCl solution with 3.5 weight percent for 48 hours.
Figure 7E:
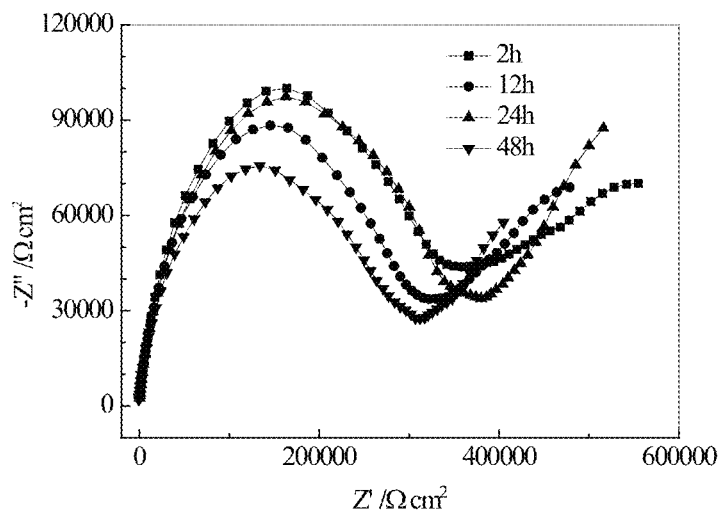
FIG. 7e is an impedance complex plane of AC impedance spectrum of water soluble graphene composite coating of embodiment 7a immersing in NaCl solution with 3.5 weight percent for 48 hours.
Figure 7F:
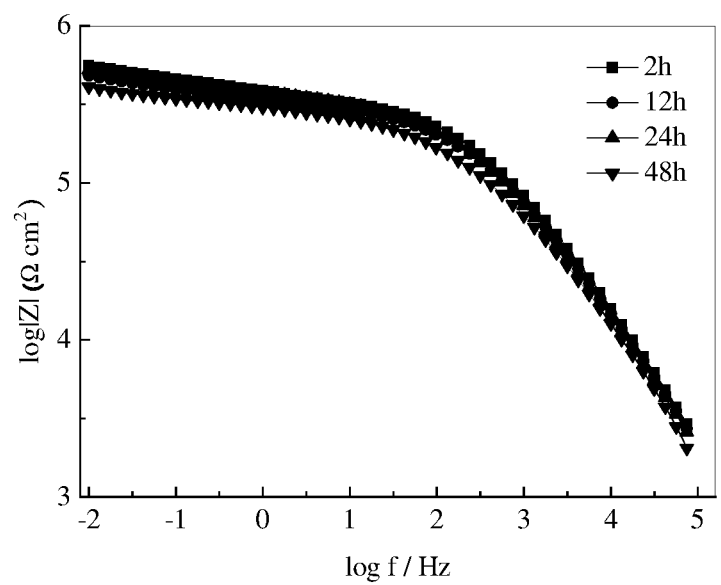
FIG. 7f is a bode plot of AC impedance spectrum of water soluble graphene composite coating of embodiment 7a immersing in NaCl solution with 3.5 weight percent for 48 hours.
Figure 7G:
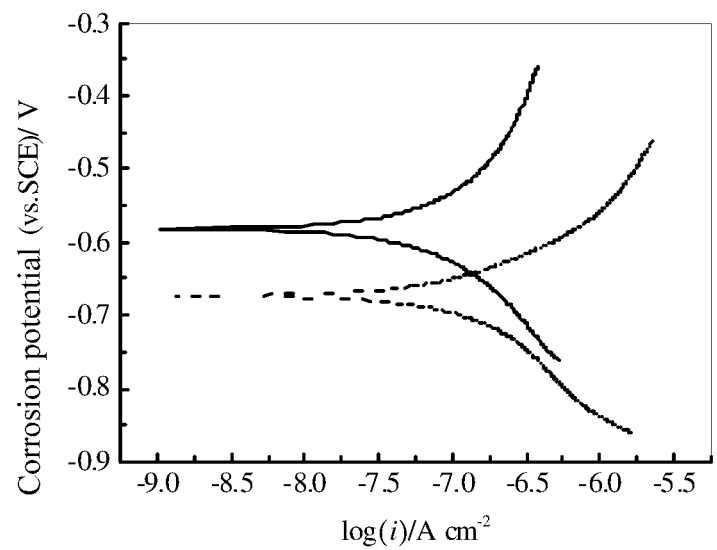

The water-soluble graphene composite coating of embodiment 7a and the water-soluble epoxy resin coating of controlled example 4a were tested for salt spray resistance. In detail, the water-soluble graphene composite coating and the water-soluble epoxy resin coating of controlled example 4a were respectively placed in a salt fog test for 500 hours, and dried at room temperature for taking pictures (see FIG. 7a). As shown in FIG. 7a, the surface of the water-soluble epoxy resin coating had obvious corrosion pits, while the surface of the water-soluble graphene composite coating had no obvious corrosion phenomenon.

The water-soluble graphene composite coating of embodiment 7a and the water-soluble epoxy resin coating of controlled example 4a were tested for corrosion resistance. In detail, the water-soluble graphene composite coating of embodiment 7a and the water-soluble epoxy resin coating of controlled example 4a were immersed in NaCl solution with 3.5 weight percent (simulated sea water) for 8 days. Using Shanghai Chen Hua CHI660E electrochemical workstation, the action mechanism of water-soluble graphene composite coating was analyzed by means of open circuit potential, AC impedance and potentiodynamic polarization curves. In detail, saturated calomel electrode with a Luggin capillary was taken as reference electrode, platinum electrode was taken as counter electrode, graphene coating/carbon steel electrode was taken as working electrode. Reference electrode, counter electrode, and working electrode were simulated in simulated seawater solution until the open circuit potential (OCP) becoming stable. Under OCP, electrochemical impedance spectra (EIS) was scanned with sine wave disturbance amplitude of 30 mV and frequency range of 100000 Hz~0.01 Hz. Polarization curve was scanned with scanning speed of 0.5 mV/s and scanning range of −200~200 mV vs. OCP. The test result of OCP was shown in FIG. 7b, and the AC impedance results was shown in FIG. 7c to FIG. 7f, and the polarization curve was shown in FIG. 7g. As shown in FIG. 7b, FIG. 7c to FIG. 7f, and FIG. 7g, impedance of the water-soluble graphene composite coating was greater than that of the water-soluble epoxy resin coating. After immersing in water after 48 hours, the self etching current density of water-soluble graphene composite coating was 130 $nA \cdot cm^{-2}$, while the self etching current density of water-soluble epoxy resin coating was 38 $nA \cdot cm^{-2}$. It was showed that the graphene modified by aniline oligomer derivative can be evenly dispersed in the water-soluble resin, thus the open circuit potential of the water-soluble graphene composite coating positively shifted, its impedance increased, its self etching current density reduced and the corrosion resistance of the water-soluble graphene composite coating was greatly improved.

Figure 7H:
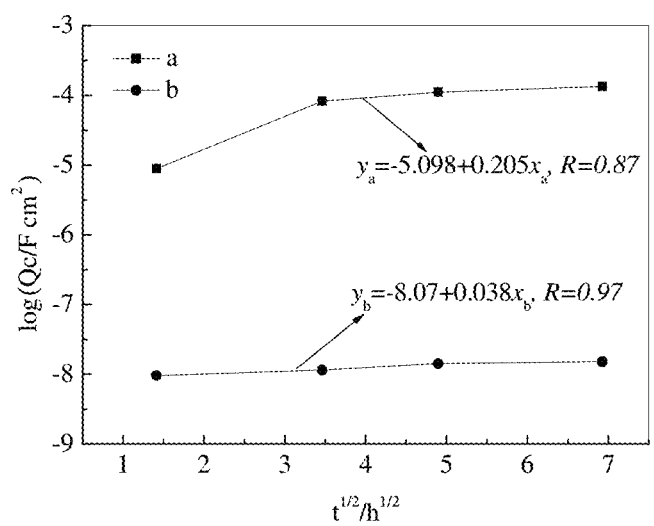
FIG. 7h is $lgQ_c$-$t^{1/2}$ curves and equation of linear regressions of water soluble graphene composite coating of embodiment 7a and water soluble epoxy resin coating of controlled example 4a immersing in NaCl solution with 3.5 weight percent for 48 hours, wherein curve a is corresponding to controlled example 4a, curve b is corresponding to embodiment 7a, Qc is capacitance of coating, and t is test time.

The water-soluble graphene composite coating of embodiment 7a and the water-soluble epoxy resin coating of controlled example 4a were tested for water-tolerant permeability. In detail, the AC impedance values were fitted, the $lgQ_c$ ($Q_c$ is capacitor of the coating) was plotted on the $t^{1/2}$, and FIG. 7h was obtained. Through linear fitting, linear regression equations of the water-soluble graphene composite coating and the water-soluble epoxy resin coating were obtained. And the diffusion coefficients of the water-soluble graphene composite coating and the water-soluble epoxy resin coating were calculated to $5.56*10^{-9}$ $cm^2/h$ and $1.61*10^{-11}$ $cm^2/h$, respectively. It was proved that the water-soluble graphene modified by aniline oligomer derivate could be uniformly dispersed in the water-soluble resin, thus slowing the diffusion rate of water molecules in the water-soluble graphene composite coating.

Figure 7I:
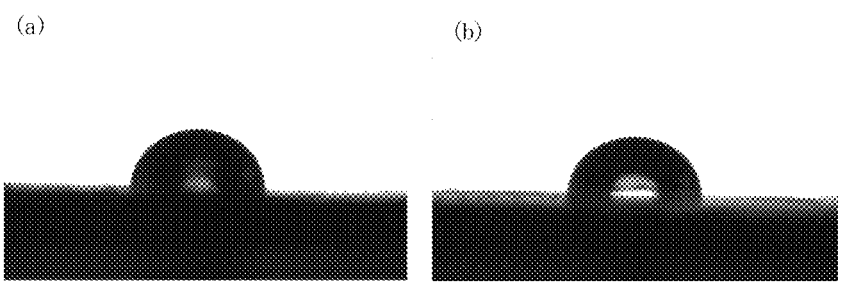

The water-soluble graphene composite coating of embodiment 7a and the water-soluble epoxy resin coating of controlled example 4a were tested for contact angle (see FIG. 7i). The results were the contact angle of the water-soluble graphene composite coating is 95.38 degrees, and the contact angle of the water-soluble epoxy resin coating is 87.32 degrees. It was proved that the water-soluble graphene modified by aniline oligomer derivate could be uniformly dispersed in the water-soluble resin, thus the contact angle of water-soluble graphene composite coating increased, and the hydrophobic property of water-soluble graphene composite coating improved.

The present disclosure also provides a method for making a graphene composite metal foil. The method for making the graphene composite metal foil includes the following steps.

S92, treating the metal foil 10 by surface cleaning, and the process of treating including degreasing, pickling, washing, alcohol washing and drying.

Wherein, the thickness of the metal foil 10 is 5 μm~500 μm. Preferably, the thickness of the metal foil 10 is 10 μm~100 μm.

S92, opening holes in the metal foil 10 after cleaning, and the methods of opening holes including laser drilling, plasma drilling, mechanical drilling, chemical etching holes, etc., and obtaining a plurality of penetrating holes 20;

Wherein, a diameter of the plurality of penetrating holes 20 is 1 μm~1000 μm, and a hole density of the plurality of penetrating holes 20 is $10^1/cm^2 \sim 10^6/cm^2$. In order to make heat diffusing of the metal foil 10 more evenly, preferably, the diameter of the plurality of penetrating holes 20 is 10 μm~500 μm, and the hole density of the plurality of penetrating holes 20 is $10^2/cm^2 \sim 10^4/cm^2$.

S93, mixing a graphene and a dispersant

S93: mixing a graphene material and a dispersant in a solvent and forming a graphene dispersion.

In detail, the graphene material, the dispersant and the solvent can be mixed by way of high-speed agitation, ultrasonic, ball milling and/or sanding, and a homogeneous and stable graphene dispersion further is obtained. The dispersant can be aniline oligomer or aniline oligomer derivative. The aniline oligomer or aniline oligomer derivative has good solubility and can be soluble in the solvent. The solvent can be deionized water, ethanol, acetone, isopropyl alcohol, butyl alcohol, ethyl acetate, toluene, chloroform, dimethylformamide, dimethyl sulfoxide, dichloroethane, or combination of A mass percentage (i.e., solid content) of graphene in the graphene dispersion is 0.1%~10%.

S94, immersing the metal foil with the plurality of penetrating holes in the graphene dispersion for 1 minute to 10 minutes and obtaining a graphene composite metal foil after drying. The graphene material is deposited on a surface of the metal foil and hole walls of the plurality of penetrating holes of the metal foil. Because the aniline oligomer or aniline oligomer derivative has positive charges, which makes the graphene dispersion positively charged, the surface of the clean metal foil is negatively charged, there is strong electrostatic forces between the graphene dispersion and the clean metal foil. Then the graphene in the graphene dispersion is deposited on surface of the metal foil, so as to obtain the graphene composite metal foil.

The graphene deposited on the surface of the metal foil and hole walls of the plurality of penetrating holes of the metal foil connects together and forms a graphene with layered structure, and the metal foil is sandwiched in the middle of the graphene with layered structure and hold up. The graphene with layered structure 30 is composed of a plurality of layers of pure graphene. The graphene with layered structure 30 covers the surface of the metal foil 10 and hole walls of the plurality of penetrating holes 20 of the metal foil. In the graphene with layered structure 30, the number of layers of pure graphene is 1~100. The thickness of The graphene with layered structure 30 is 0.01 μm~10 μm. A thermal conductivity of the graphene composite metal foil is 500 W/m·K~2000 W/m·K and the bonding strength between the graphene and the metal foil 10 is 1 Mpa~100 Mpa. The graphene composite metal foil can be used as a heat radiating element and can be applied to an integrated circuit, an electronic device, a heat exchanger or a heat sink of LED.

Compared with the prior art, the method for making the graphene composite metal foil of the present disclosure has following advantages. The graphene is dispersed by aniline oligomer or aniline oligomer derivative and the homogeneous and stable graphene dispersion is obtained. Because the aniline oligomer or aniline oligomer derivative has positive charges, which makes the graphene dispersion positively charged, the surface of the clean metal foil is negatively charged, there is strong electrostatic forces between the graphene dispersion and the clean metal foil. Therefore, the operation of adding an adhesive to coat is omitted, and the graphene is more stable and adhered to the surface of the metal foil byelectrostatic force.

Compared with the prior art, the graphene composite metal foil of the present disclosure has following advantages. (1) It has excellent heat dissipation performance. The graphene prepared by the prior art is all tiled on the surface of the metal foil, and the heat flow direction is perpendicular to the surface of the graphene, resulting in the final heat dissipation effect is not ideal. The graphene composite metal foil of the present disclosure has a layered graphene on both sides of the metal foil and on the hole walls of the plurality of penetrating holes. The bottom layered graphene of the metal foil can not only rapidly transfer heat of a heat source to the surface of the layered graphene, but also transfer the heat to the upper layered graphene of the metal foil by the layered graphene attached to the hole walls of the plurality of penetrating holes. The heat transferred to the upper layered graphene can be rapidly diffused through the plane surface of the layered graphene, and finally rapidly cooled by convection and radiation. That is, the graphene on hole walls of the plurality of penetrating holes of the graphene composite metal foil can increase thermal conductivity perpendicular to the surface of the metal foil, thereby greatly improving the overall thermal conductivity of the graphene composite metal foil. (2) The bonding strength between the layered graphene and the metal foil is large. Graphene prepared by the existing technology is easy to lead to delamination of graphene because of interfacial stress between the surface of metal foil and the graphene. While in the graphene composite metal foil of the present disclosure, the graphene not only covers two surface of the metal foil but also is deposited on the hole walls of the plurality of penetrating holes of the metal foil, which formed a graphene with layered structure integrally. The metal foil is sandwiched in the middle of the graphene with layered structure and hold up, improving the bonding strength between the graphene and the metal foil. In addition, graphene composite metal foils are prepared by electrostatic adsorption, and the adhesion of graphene on the metal foil is strong, and the bonding strength is high. (3) The process of the method is simple and the preparation cost is low. The prior art such as by chemical vapor deposition (CVD) method, growing graphene on the surface of a foil, it needs to grow equipment of high cost, longer growth time, higher growth conditions (high temperature, high vacuum), and has certain selectivity to metal foil (need to be able to act as metal catalyst), and it is hard to grow continuously. And in the present disclosure the graphene composite metal foil is prepared by the method of liquid phase deposition. The growth conditions, growth of equipment and material of this method are not specially required, the growth period is short (1 min~10 min), and the graphene can be continuously formed, thus greatly improving the producing efficiency.

The present disclosure also provides a graphene conductive painting. The graphene conductive painting includes a graphene material, a graphene dispersant, and a paint matrix. The graphene dispersant includes aniline oligomer or aniline oligomer derivative, which is an electroactive polymer. And the aniline oligomer or aniline oligomer derivative is combined with the graphene material via π-π bond, resulting in the graphene material distributing in the paint matrix uniformly. The paint matrix can be water-soluble polyurethane, but are not limited to polyurethane system. The paint matrix also includes other polymer film-forming resin, such as epoxy resin, alkyd resin, polymethyl acrylic ester emulsion, silicone resin, etc. Because the graphene dispersant includes aniline oligomer or aniline oligomer derivative, graphene having a electric conductivity can be uniformly dispersed in the paint matrix. Thus the graphene conductive painting obtained has a good electric conductivity, and can be applied to the conductive ink, antistatic coating, electromagnetic shielding, stealth, etc.

In order to further describe the present disclosure, methods for making the graphene conductive painting with different parameters are as follows.

Embodiment 8a 0.025 g water soluble sulfonated polyaniline, 3 mL deionized water, and 0.025 g graphene were mixed and ultrasonic dispersed. Then 1.47 g water-soluble polyurethane (solid content 34%) was added. A graphene conductive painting was obtained. The graphene conductive painting was coated and cured under 60 degrees centigrade. A polyurethane conductive coating containing 5% graphene was gained. The electric conductivity of the polyurethane conductive coating was tested. The electric conductivity of the polyurethane conductive coating was 1287 ohm/sq.

Embodiment 8b 0.025 g water soluble sulfonated polyaniline, 3 mL deionized water, and 0.025 g graphene were mixed and ultrasonic dispersed. Then 1.47 g water-soluble polyurethane (solid content 34%) was added. A graphene conductive painting was obtained. The graphene conductive painting was coated and cured under 60 degrees centigrade. A polyurethane conductive coating containing 2.5% graphene was gained. The electric conductivity of the polyurethane conductive coating was tested. The electric conductivity of the polyurethane conductive coating was 3276 ohm/sq.

The instructions for the above embodiments are only useful in helping to understand the methods and their core ideas of the present disclosure. It should be pointed out that one in the art can also carry out some improvement and modification of the invention, in the premise of violating the principle of the present disclosure. The improvement and modification of the present disclosure also should fall into the scope of protection of the present disclosure. Modifications of these examples for one in the art is obviously. Other embodiments can be taken when they do not violate the spirit or the scope of the present disclosure. Therefore, the present disclosure will not be limited to these embodiments shown, but to expand to the widest range consistent with the principles and novelty features disclosed herein.

What is claimed is:

1. A method for dispersing graphene, the method comprising the following steps:
    providing a graphene material and a graphene dispersant, wherein the graphene dispersant comprises aniline oligomer, which is an electroactive polymer, and the aniline oligomer is able to combine with the graphene material via π-π bond, wherein the graphene material is graphene; and
    adding the graphene material and the graphene dispersant to a dispersing medium, and stirring at a temperature of 70 degrees centigrade or 80 degrees centigrade for 2 hours, in order to combine the aniline oligomer with the graphene material via π-π bond and disperse the graphene material in the dispersing medium by the graphene dispersant,
    wherein the aniline oligomer is selected from the group consisting of aniline trimer, aniline tetramer, aniline pentamer, aniline hexamer, aniline octamer, and combination thereof.

2. The method of claim 1, wherein the dispersing medium comprises water, organic solvent, polymer, or combinations thereof.

3. The method of claim 2, wherein the organic solvent is selected from the group consisting of ethanol, acetone, isopropyl alcohol, butyl alcohol, ethyl acetate, toluene, chloroform, N,N-dimethylformamide, dimethyl sulfoxide, and dichloroethane.

4. The method of claim 2, wherein the polymer is selected from the group consisting of polyethylene (PE), polypropylene (PP), polystyrene (PS), polymethyl methacrylate (PMMA), polyvinyl chloride (PVC), nylon, polycarbonate (PC), polyurethane (PU), polytetrafluoroethylene (PTFE), polyethylene terephthalate (PET), or combinations thereof.

5. The method of claim 2, wherein the polymer is silicone resin, acrylic resin, polyester resin, polyurethane resin, alkyd resin, epoxy resin, or combinations thereof.

6. The method of claim 2, wherein a mass ratio of the graphene material and the water or organic solvent is 1:10~1:10000.

7. The method of claim 6, wherein the mass ratio of the graphene material and the water or organic solvent is 1:20~1:1000.

8. The method of claim 2, wherein a ratio of the weight of the aniline oligomer or aniline oligomer and the total weight of the graphene material and the water or organic solvent is (0.01~10):100.

9. The method of claim 8, wherein the ratio of the weight of the aniline oligomer or aniline oligomer and the total weight of the graphene material and the water or organic solvent is (6~10):100.

10. The method of claim 8, wherein further adding a dispersing agent in the step of adding the graphene material and the graphene dispersant to the dispersing medium, and the dispersing agent is selected from the group consisting of silane coupling agent, polyvinyl alcohol, polyvinyl pyrrolidone, organic modified polysiloxane dipropylene glycol monomethyl ether solution, organic silicon surfactant and/or fluorosurfactant.

11. A method for making a graphene composite powder, comprising the following steps:
    dispersing a graphene material in a dispersing medium and obtaining a mixture A, wherein the graphene material is graphene;
    adding a dispersing agent and aniline oligomer, and stirring at a temperature of 70 degrees centigrade or 80 degrees centigrade for 2 hours, in order to obtain a mixture B, wherein the graphene is mixed uniformly with the aniline oligomer, and a π-π bond is formed between the graphene and the aniline oligomer; and
    drying the mixture B and obtaining the graphene composite powder modified by the aniline oligomer.

12. The method of claim 11, wherein the dispersing medium is deionized water, ethanol, acetone, isopropyl alcohol, butanol, ethyl acetate, toluene, chloroform, dimethyl methylamine, dimethyl sulfone, dichloroethane, or combinations thereof, a mass ratio of the graphene and the dispersing medium is 1:10~1:10000, the dispersing agent is selected from the group consisting of silane coupling agent, polyvinyl alcohol, polyvinyl pyrrolidone, organic modified polysiloxane dipropylene glycol monomethyl ether solution, organic silicon surfactant and/or fluorosurfactant, and a mass ratio of the dispersing agent and the mixture A is (0.01~1):100.

* * * * *